United States Patent
Routray et al.

(10) Patent No.: US 11,354,338 B2
(45) Date of Patent: Jun. 7, 2022

(54) COGNITIVE CLASSIFICATION OF WORKLOAD BEHAVIORS IN MULTI-TENANT CLOUD COMPUTING ENVIRONMENTS

(71) Applicant: International Business Machines Corporation, Armonk, NY (US)

(72) Inventors: Ramani Routray, San Jose, CA (US); Aly Megahed, San Jose, CA (US); Samir Tata, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 982 days.

(21) Appl. No.: 16/051,192

(22) Filed: Jul. 31, 2018

(65) Prior Publication Data

US 2020/0042636 A1    Feb. 6, 2020

(51) Int. Cl.
| | | |
|---|---|---|
| G06F 15/16 | (2006.01) | |
| G06F 16/28 | (2019.01) | |
| H04L 9/40 | (2022.01) | |
| G06K 9/62 | (2022.01) | |
| G06N 20/00 | (2019.01) | |
| G06F 16/35 | (2019.01) | |

(52) U.S. Cl.
CPC ............ *G06F 16/285* (2019.01); *G06F 16/35* (2019.01); *G06K 9/6267* (2013.01); *G06N 20/00* (2019.01); *H04L 63/1425* (2013.01)

(58) Field of Classification Search
CPC .................... G06K 9/6267; H04L 63/1425
See application file for complete search history.

(56) References Cited

U.S. PATENT DOCUMENTS

| | | |
|---|---|---|
| 8,935,393 B1 | 1/2015 | Jackson et al. |
| 9,210,040 B2 | 12/2015 | Mikkilieneni et al. |
| 10,291,638 B1 * | 5/2019 | Chandana .............. H04L 67/10 |
| 10,402,733 B1 * | 9/2019 | Li .......................... G06N 7/005 |
| 2005/0021530 A1 | 1/2005 | Garg et al. |
| 2012/0078684 A1 | 3/2012 | Maciocoi et al. |
| 2012/0330711 A1 | 12/2012 | Jain et al. |
| 2013/0185729 A1 | 7/2013 | Vasic et al. |
| 2013/0254384 A1 | 9/2013 | Wray et al. |
| 2013/0268914 A1 | 10/2013 | Oslake et al. |

(Continued)

FOREIGN PATENT DOCUMENTS

WO    2016070762 A1    5/2016

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Phuoc H Nguyen
(74) *Attorney, Agent, or Firm* — Sherman IP LLP; Kenneth L. Sherman; Hemavathy Perumal

(57) ABSTRACT

One embodiment provides a method comprising receiving data relating to a tenant utilizing a cloud computing environment, and determining one or more classifications for a variation in current workload resource consumption of the tenant based on the data. The current workload resource consumption is indicative of current usage of one or more computing resources of the cloud computing environment.

20 Claims, 17 Drawing Sheets

(56) References Cited

U.S. PATENT DOCUMENTS

| | | | |
|---|---|---|---|
| 2014/0101666 A1 | 4/2014 | Jackson et al. | |
| 2014/0297569 A1* | 10/2014 | Clark | G06Q 10/00 |
| | | | 706/11 |
| 2015/0172321 A1 | 6/2015 | Kirti et al. | |
| 2015/0207703 A1 | 7/2015 | Gallagher et al. | |
| 2015/0254555 A1 | 9/2015 | Williams, Jr. et al. | |
| 2015/0365309 A1 | 12/2015 | Kaminski et al. | |
| 2016/0006640 A1 | 1/2016 | Masuda et al. | |
| 2016/0283713 A1 | 9/2016 | Brech et al. | |
| 2018/0124080 A1* | 5/2018 | Christodorescu | G06F 21/554 |
| 2018/0189163 A1 | 7/2018 | Megahed et al. | |
| 2018/0199239 A1 | 7/2018 | Sabater-Maroto et al. | |
| 2019/0220319 A1* | 7/2019 | Parees | G06F 9/4881 |
| 2020/0005093 A1* | 1/2020 | Vichare | G06K 9/6223 |

OTHER PUBLICATIONS

Raiyn, J., "A survey of Cyber Attack Detection Strategies," International Journal of Security and Its Applications, 2014, pp. 247-256, vol. 8, No. 1, United States.

Ali-Eldin, A., et al. "Workload classification for efficient auto-scaling of cloud resources", Department of Computer Science, Tech. Rep., 2013, pp. 1-36, Umea University, Umea, Sweden.

List of IBM Patents or Patent Applications Treated as Related; Aly Megahed, U.S. Appl. No. 16/147,136, filed Sep. 28, 2018.

Megahed, A. et al., "Monitoring services in the Internet of Things: an optimization approach", Computing, Sep. 8, 2018, pp. 1-27, Springer, Berlin, Heidelberg.

Tata, S. et al., "An Optimization Approach for Adaptive Monitoring in IoT Environments", 2017 IEEE 14th International Conference on Services Computing (SCC), Jun. 1, 2017, pp. 378-385, IEEE, United States.

Munawar, M. et al., "Adaptive Monitoring with Dynamic Differential Tracing-Based Diagnosis", In International Workshop on Distributed Systems: Operations and Management, Sep. 22, 2008, pp. 162-175, Springer, Berlin, Heidelberg.

Jeswani, D. et al., "Adaptive Monitoring: A Framework to Adapt Passive Monitoring using Probing", Proceedings of the 8th International Conference on Network and Service Management (CNSM 2012), Oct. 22, 2012, pp. 350-356, International Federation for Information Processing, United States.

Trihinas, D. et al., "AdaM: an Adaptive Monitoring Framework for Sampling and Filtering on IoT Devices", 2015 IEEE International Conference on Big Data (Big Data), Oct. 29, 2015, pp. 717-726, IEEE, United States.

* cited by examiner ced classification system configured to classify a variation in current workload resource consumption of a tenant by analyzing structured data and unstructured data separately, wherein potential classifications for the variation include a classification that the variation is an anomaly, in one or more embodiments;

COGNITIVE CLASSIFICATION OF WORKLOAD BEHAVIORS IN MULTI-TENANT CLOUD COMPUTING ENVIRONMENTS

Embodiments of the present invention generally relate to cloud computing environments, and more particularly, to a system and method for cognitive classification of workload behaviors in multi-tenant cloud computing environments.

BACKGROUND

Workload resource consumption of a tenant in a cloud computing environment can include, but is not limited to, memory consumption, central processing unit (CPU) usage, storage, IOPS. Workload resource consumption of tenants in cloud computing environments can vary over time.

SUMMARY

One embodiment provides a method comprising receiving data relating to a tenant utilizing a cloud computing environment, and determining one or more classifications for a variation in current workload resource consumption of the tenant based on the data. The current workload resource consumption is indicative of current usage of one or more computing resources of the cloud computing environment.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description are exemplary and explanatory of preferred embodiments of the invention, and are not restrictive of various embodiments of the invention, as claimed.

BRIEF DESCRIPTION OF THE DRAWINGS

The subject matter which is regarded as embodiments of the invention is particularly pointed out and distinctly claimed in the claims at the conclusion of the specification. The foregoing and other aspects, features and advantages of the invention are apparent from the following detailed description taken in conjunction with the accompanying drawings in which:

Figure 1:
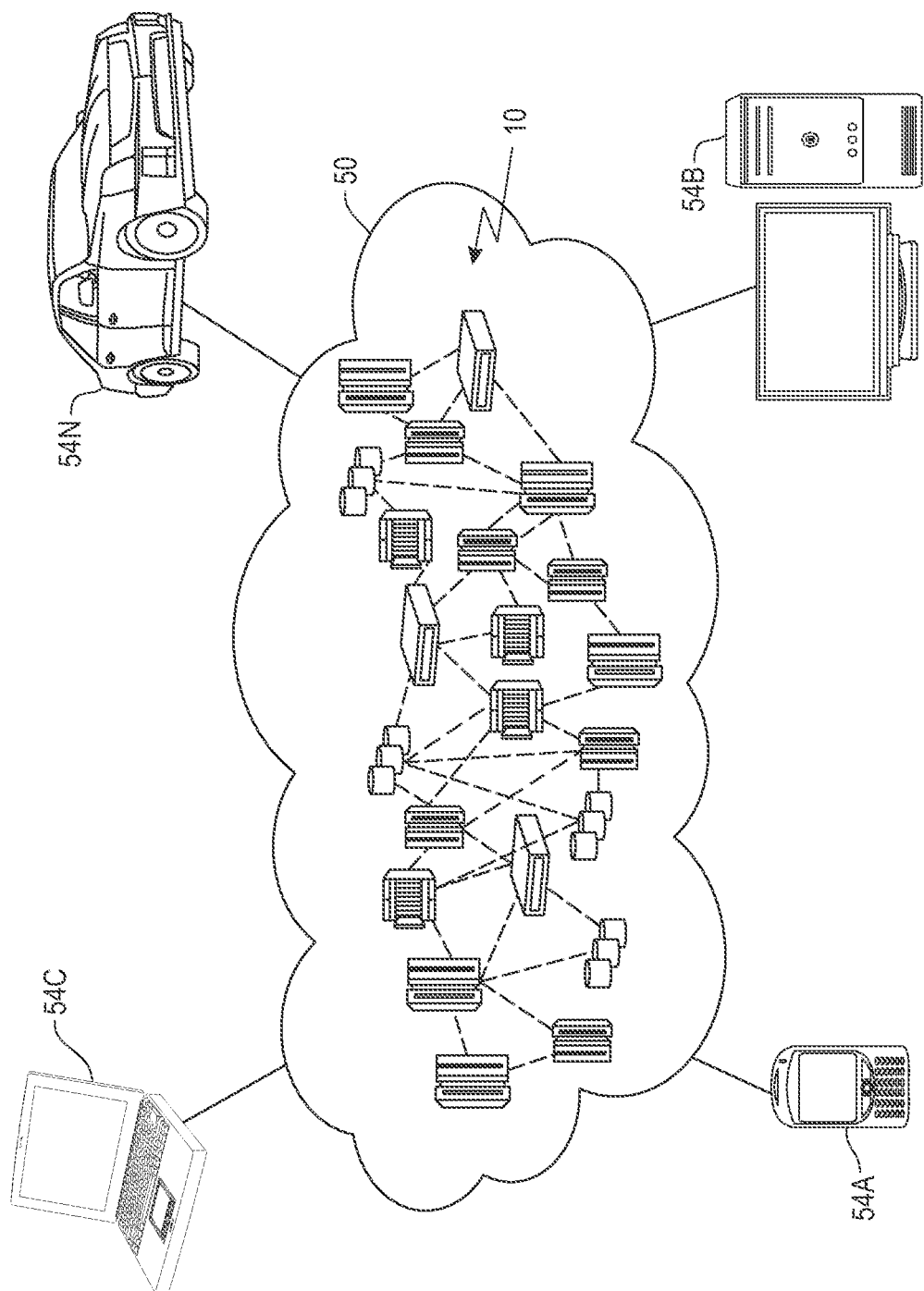
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the present invention generally relate to cloud computing environments, and more particularly, to a system and method for cognitive classification of workload behaviors in multi-tenant cloud computing environments. One embodiment provides a method comprising receiving data relating to a tenant utilizing a cloud computing environment, and determining one or more classifications for a variation in current workload resource consumption of the tenant based on the data. The current workload resource consumption is indicative of current usage of one or more computing resources of the cloud computing environment.

For expository purposes, the term "multi-tenant cloud computing environment" as used herein generally refers to a cloud computing environment providing a shared pool of computing resources (e.g., networks, network bandwidth, servers, processing, memory, storage, applications virtual machines, services, licenses, etc.) available for consumption by multiple tenants.

For expository purposes, the term "workload resource consumption" as used herein generally refers to usage of one or more computing resources of a cloud computing environment by a tenant utilizing the one or more computing resources for its workload (e.g., one or more tasks that the tenant is assigned/tasked to perform). The terms "workload behavior" and "workload resource consumption" are used interchangeably in this specification.

Cloud computing is a strategic area of business at many companies now. It is beneficial for a cloud provider providing a cloud computing environment to classify variations in workload resource consumptions of tenants utilizing the cloud computing environment to address the needs of the tenants.

One or more embodiments of the invention provide a workload resource consumption classifier that a cloud provider can utilize to classify variations in workload behaviors of tenants utilizing its cloud computing environment. In one embodiment, the classifier is configured to determine a classification for a variation in workload behavior of a tenant based on structured data and unstructured data for the tenant.

A cloud provider can utilize the classifier as a tool that facilitates the cloud provider in determining actions to take to better address the needs of its tenants. For example, if the classifier determines that a variation in workload resource consumption is attributable to occurrence of an event such as a cyber attack, the cloud provider can enact and enforce improved security measures to overcome the cyber attack. As another example, if the classifier determines that a variation in workload resource consumption of a particular tenant is attributable to deployment of a new application, the cloud provider cannot overbook computing resources for the tenant.

Additionally, a cloud provider can use classifications provided by the classifier as a basis for recommendations to its tenants, thereby facilitating the cloud provider with upselling some of its products. For example, if a particular tenant is continuously growing storage and data stored by the tenant is compression friendly, the cloud provider can recommend that the tenant buy a compression license.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
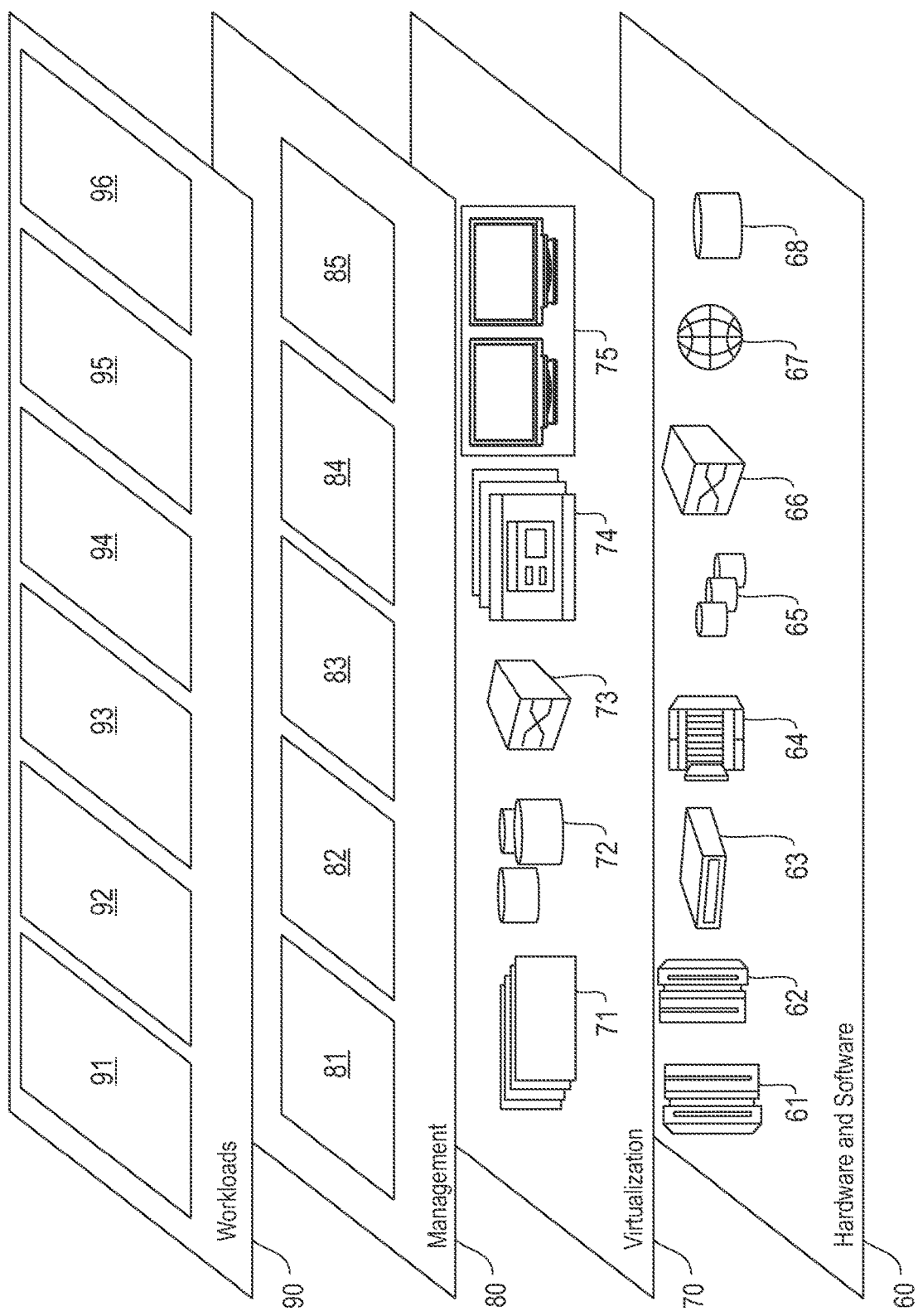
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and workload resource consumption 96 (e.g., a workload resource consumption classifier/classification system 100, as described in detail later herein).

Figure 3:
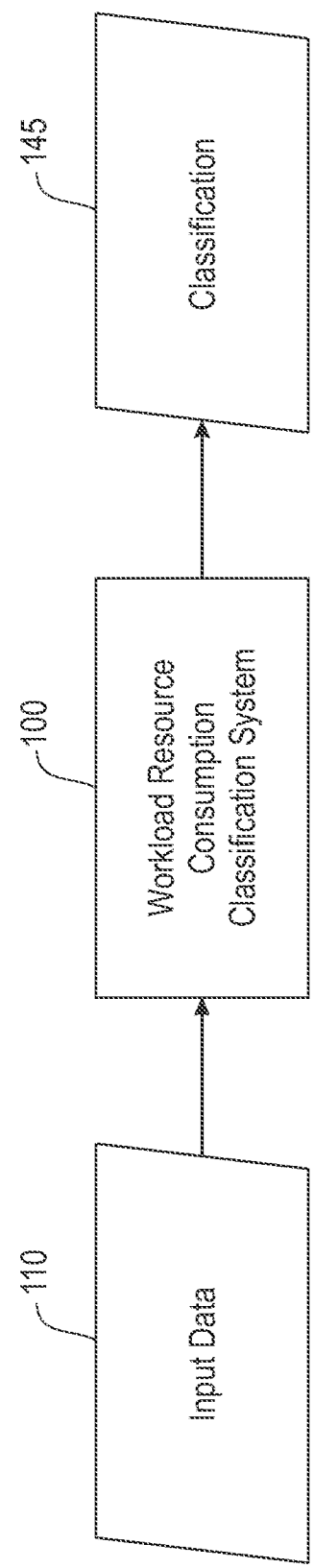
FIG. 3 illustrates a workload resource consumption classification system, in one or more embodiments.

FIG. 3 illustrates a workload resource consumption classification system ("classification system") 100, in one or more embodiments. The classification system 100 is configured for cognitive classification of workload behaviors in a multi-tenant cloud computing environment (e.g., cloud computing environment 50 in FIG. 1).

In one embodiment, the classification system 100 is configured to: (1) receive different types of input data 110, and (2) determine one or more classifications 145 for a variation in a current workload resource consumption of a tenant based on all input data received. In one embodiment, the classification system 100 is configured to receive input data for each tenant utilizing the cloud computing environment.

In one embodiment, different types of input data 110 that the classification system 100 receives include, but is not limited to, one or more of the following: (1) historical workload data 210 for one or more tenants (FIG. 4B) indicative of historical workload resource consumption of the one or more tenants (i.e., workload resource consumption over time) and types and timing of events that occurred in the past that are attributable to variations in the historical workload resource consumption, and (2) current workload data 220 for a particular tenant indicative of current workload resource consumption of the tenant and one or more variations in the current workload resource consumption.

Figure 4A:
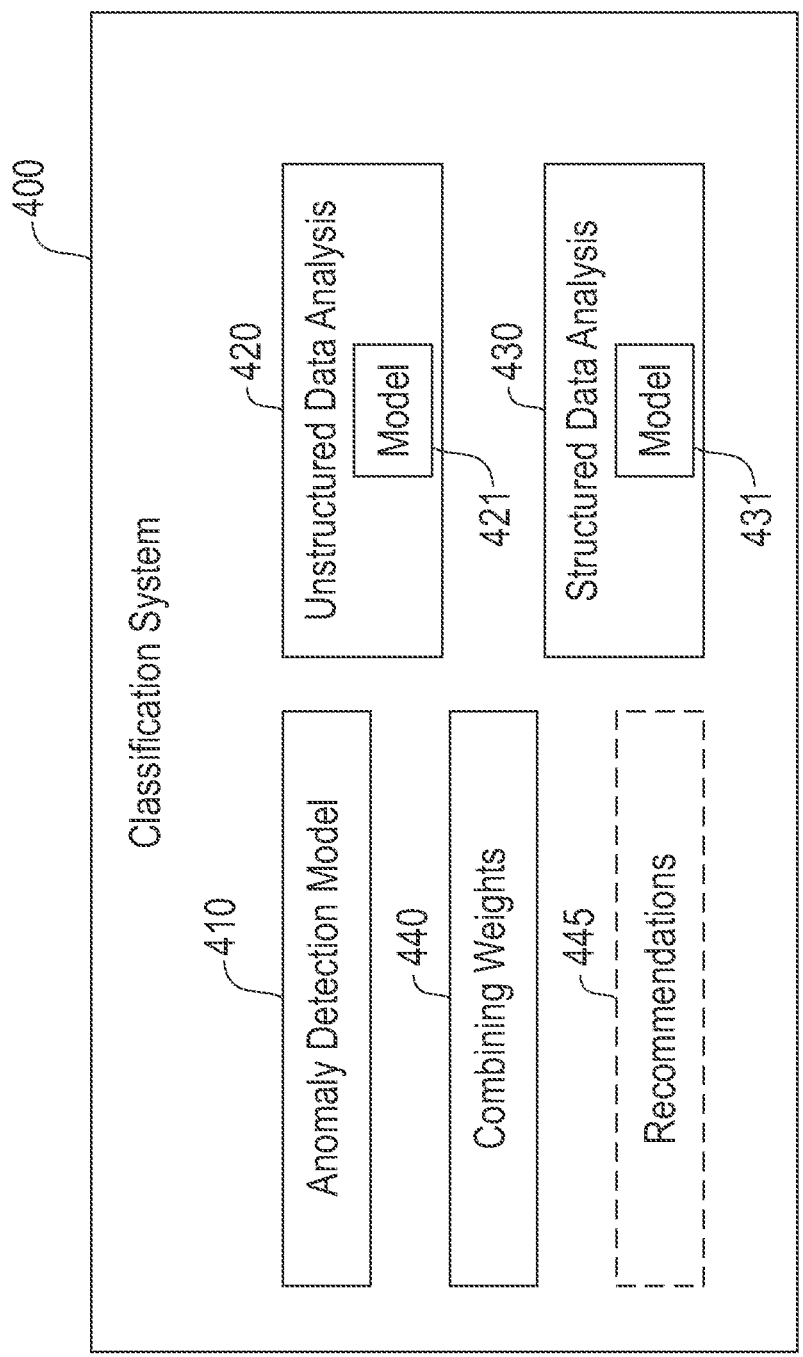
FIG. 4A illustrates a first example classification system configured to detect an anomaly in a variation in current workload resource consumption of a tenant and classify the variation by analyzing structured data and unstructured data for the tenant separately, in one or more embodiments.
Figure 4B:
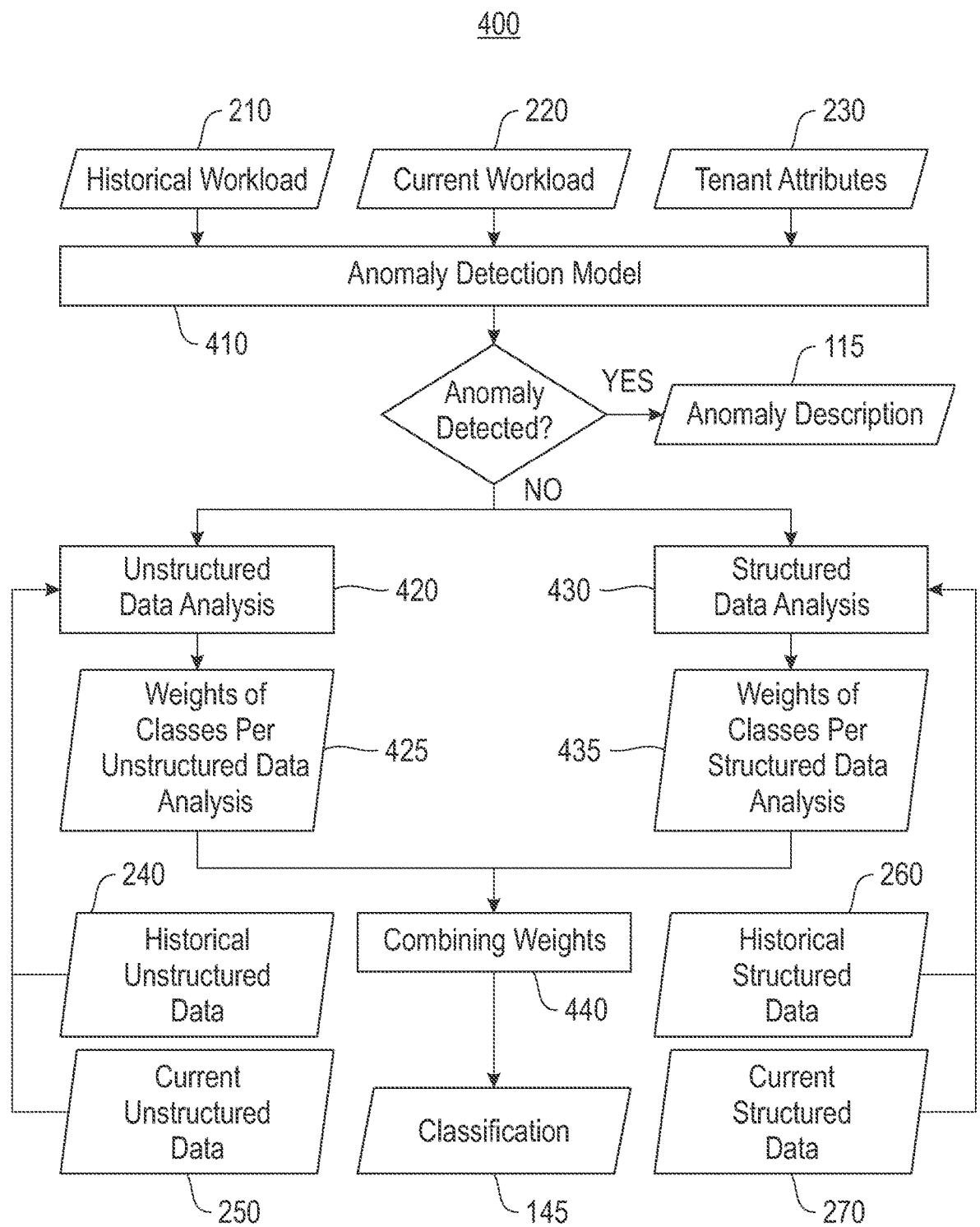
FIG. 4B illustrates an example workflow of the first example classification system, in one or more embodiments.

In one embodiment, historical workload data 210 for one or more tenants includes at least one of historical structured data 260 (FIG. 4B) for the one or more tenants and historical unstructured data 240 for the one or more tenants (FIG. 4B). In one embodiment, historical unstructured data 240 for one or more tenants comprises time-stamped external data related to the one or more tenants such as, but not limited to, historical news information about the one or more tenants, historical news information about a deployment of a new application, historical news information about a cloud provider providing the cloud computing environment, etc. In one embodiment, historical unstructured data 240 for one or more tenants comprises different types of raw data (e.g., unprocessed data, etc.) such as, but not limited to, one or more of the following: text, images, photos, videos, audio, etc. In one embodiment, historical structured data 260 for one or more tenants includes time-stamped external data related to the one or more tenants such as, but not limited to, historical news information about the one or more tenants, historical news information about a deployment of a new application, historical news information about a cloud provider providing the cloud computing environment, etc. In one embodiment, historical structured data 260 for one or more tenants comprises different types of pre-processed data (e.g., annotated data, indexed data, etc.) such as, but not limited to, one or more of the following: text, images, photos, videos, audio, etc.

In one embodiment, current workload data 220 for a tenant includes at least one of current structured data 270 for the tenant (FIG. 4B) and current unstructured data 250 for the tenant (FIG. 4B). In one embodiment, current unstructured data 250 for a tenant comprises time-stamped external data related to the tenant such as, but not limited to, current news information about the tenant, current news information about a deployment of a new application, current news information about a cloud provider providing the cloud computing environment, etc. In one embodiment, current unstructured data 250 for a tenant comprises different types of raw data (e.g., unprocessed data, etc.) such as, but not limited to, one or more of the following: text, images, photos, videos, audio, etc. In one embodiment, current structured data 270 for a tenant includes time-stamped external data related to the tenant such as, but not limited to, current news information about the tenant, current news information about a deployment of a new application, current news information about a cloud provider providing the cloud computing environment, etc. In one embodiment, current structured data 270 for a tenant comprises different types of pre-processed data (e.g., annotated data, indexed data, etc.) such as, but not limited to, one or more of the following: text, images, photos, videos, audio, etc.

In one embodiment, tenant attributes data 230 indicative of one or more attributes of a tenant are obtained from at least one of historical workload data 210 for the tenant and current workload data 220 for the tenant. Examples of one or more attributes of a tenant include, but are not limited to, industry, geography, company size, etc.

For example, one or more attributes of one or more tenants in relation to historical workload resource consumption of the one or more tenants (i.e., historical attributes of the one or more tenants) are obtained from historical workload data 210 for the one or more tenants (e.g., from historical structured data 260 included in the historical workload data 210). The one or more attributes obtained are indicative of a context of the historical workload resource consumption. As another example, one or more attributes of a tenant in relation to current workload resource consumption of the tenant (i.e., current attributes of the tenant) are obtained from current workload data 220 for the tenant (e.g., from current structured data 270 included in the current workload data 220). The one or more attributes obtained are indicative of a context of the current workload resource consumption.

In one embodiment, the classification system 100 operates as a categorical classification system configured to predict (i.e., determine) a classification 145 for any variation in current workload resource consumptions of tenants. As described in detail later herein, examples of different classifications 145 include, but are not limited to, deployment of a new application, increase in a number of users accessing a particular application, etc.

In one embodiment, the classification system 100 is based on, but is not limited to, a multi-class logistic regression model, a Naïve-Bayes model, etc. The classification system 100 predicts a classification 145 for a variation in a current workload resource consumption of a tenant based on one or more features related to the current workload resource consumption such as, but not limited to, attributes of the tenant, workload variation characteristics (e.g., increase/decrease value, time period, historical variation of the same workload, etc.), features resulting from analytics (e.g., text analytics, etc.) of input data related to the tenant, etc.

In one embodiment, the classification system 100 analyzes both current structured data and current unstructured data for a tenant to provide a more accurate classification 145 for a variation in current workload resource consumption of the tenant.

Different embodiments of the classification system 100 are described herein below.

FIG. 4A illustrates a first example classification system 400 configured to detect an anomaly in a variation in current workload resource consumption of a tenant and classify the variation by analyzing structured data and unstructured data for the tenant separately, in one or more embodiments. FIG. 4B illustrates an example workflow of the classification system 400, in one or more embodiments. In one embodiment, the classification system 100 in FIG. 3 is implemented as the classification system 400.

In one embodiment, the classification system 400 comprises a trained (i.e., learned) anomaly detection model 410 configured to detect (i.e., determine) an anomaly in a variation in current workload resource consumption of a tenant based on historical workload data 210 for one or more tenants, current workload data 220 for the tenant, and tenant attributes data 230 indicative of one or more attributes of the tenant. If the anomaly detection model 410 detects an anomaly, the classification system 400 generates, as output, an anomaly description 115 indicative of the anomaly detected. If the anomaly detection model 410 does not detect an anomaly, the classification system 400 proceeds to determine and generate, as output, one or more classifications 145 for the variation.

In one embodiment, examples of different anomalies the anomaly detection model 410 is trained to detect include, but are not limited to, an anomalously high workload resource consumption for a particular period of time where workload resource consumption prior to and after this period of time is not as high and the anomalously high workload resource consumption is triggered by an event (e.g., security/cyber attacks).

In one embodiment, in a training phase (i.e., training stage), a machine learning classifier is trained to detect an anomaly based on training data including historical workload data 210 for one or more tenants. In one embodiment, different techniques are applied to train the machine learning classifier based on the training data such as, but not limited to, density-based techniques (e.g., k-nearest neighbor, local outlier factor, etc.), subspace and correlation-based outlier detection for high-dimensional data techniques, and one class support vector machines. After training, the resulting machine learning classifier is deployed as an anomaly detection model 410 for use in a deployment phase (i.e., deployment stage) to detect an anomaly in a variation in current workload resource consumption of a particular tenant.

In one embodiment, the classification system 400 separately analyzes current unstructured data and current structured data for a tenant to determine one or more classifications 145 for a variation in current workload resource consumption of the tenant. As described in detail later herein, the classification system 400 utilizes two different machine learning classifiers, wherein each machine learning classifier is trained to predict potential classifications for a variation in workload resource consumption of a tenant. In one embodiment, the potential classifications include, but are not limited to, one or more of the following: (1) a classification representing a deployment of a new application that results in a high steady increase in workload resource consumption for a substantial period of time (e.g., a very long period of time), (2) a classification representing an increase in a number of users accessing a particular application that results in a steady increase in workload resource consumption (the steady increase is less than that resulting from deployment of a new application), and (3) a classification representing a random unknown event. In one embodiment, a variation in current workload resource consumption of a tenant is classified by the classification system 400 as any combination of the above-described classifications.

Specifically, the classification system 400 comprises unstructured data analysis unit 420 configured to: (1) receive one or more types of unstructured data, such as at least one of historical unstructured data 240 for one or more tenants (e.g., obtained from historical workload data 210 for the one or more tenants) and current unstructured data 250 for a particular tenant (e.g., obtained from current workload data 220 for the tenant), (2) perform unstructured data analysis by applying a trained classification (i.e., predictive) model 421 to the current unstructured data for the tenant, and (3) based on the unstructured data analysis, generate a first set of weights 425 for the tenant. In one embodiment, the first set of weights 425 comprises, for each potential (i.e., candidate) classification (i.e., class) for the variation, a corresponding weight indicative of a likelihood/probability that the variation is classified as the potential classification. In one embodiment, the unstructured data analysis unit 420 is configured to receive unstructured data for each tenant utilizing the cloud computing environment.

In one embodiment, unstructured data analysis performed by the unstructured data analysis unit 420 involves, but is not limited to, one or more of the following: text analytics (e.g., on text included in unstructured data), image or video processing (e.g., on photos, images and/or videos included in unstructured data), audio analytics (e.g., on audio included in unstructured data), etc. For example, text analytics includes, but is not limited to, analyzing text into word/corpus, counting frequencies, and normalizing the frequencies (e.g., by dividing them by frequency of a word in the whole history).

In one embodiment, in a training phase, a machine learning classifier is trained to predict a potential classification for a variation in workload resource consumption based on training data including historical unstructured data 240 for one or more tenants. In one embodiment, different techniques are applied to train the machine learning classifier based on the training data such as, but not limited to, density-based techniques (e.g., k-nearest neighbor, local outlier factor, etc.), subspace and correlation-based outlier detection for high-dimensional data techniques, and one class support vector machines. For example, the machine learning classifier is trained based on features relating to workload resource consumption (e.g., features such as normalized frequencies resulting from text analytics, etc.). After training, the resulting machine learning classifier is deployed as a classification model 421 for use in a deployment phase to predict a potential classification for a variation in current workload resource consumption of a particular tenant based on current unstructured data for the tenant (i.e., unstructured data analysis).

In one embodiment, unstructured data analysis performed by the unstructured data analysis unit 420 involves structuring unstructured data for a tenant into structured data and performing analytics (e.g., text analytics, etc.) on the resulting structured data.

In one embodiment, the classification system 400 comprises structured data analysis unit 430 configured to: (1) receive one or more types of structured data, such as at least one of historical structured data 260 for one or more tenants (e.g., obtained from historical workload data 210 for the one or more tenants) and current structured data 270 for a particular tenant (e.g., obtained from current workload data 220 for the tenant), (2) perform a structured data analysis by applying a trained classification model 431 to the current structured data for the tenant, and (3) based on the structured data analysis, generate a second set of weights 435 for the tenant. The second set of weights 435 comprises, for each potential classification for the variation, a corresponding weight indicative of a likelihood/probability that the variation is classified as the potential classification. In one embodiment, the structured data analysis unit 430 is configured to receive structured data for each tenant utilizing the cloud computing environment.

In one embodiment, structured data analysis performed by the structured data analysis unit 430 involves, but is not limited to, one or more of the following: text analytics (e.g., on text included in structured data), image or video processing (e.g., on photos, images and/or videos included in structured data), audio analytics (e.g., on audio included in structured data), etc.

In one embodiment, in a training phase, a machine learning classifier is trained to predict a potential classification for a variation in workload resource consumption based on training data including historical structured data 260 for one or more tenants. In one embodiment, different techniques are applied to train the machine learning classifier based on the training data such as, but not limited to, density-based techniques (e.g., k-nearest neighbor, local outlier factor, etc.), subspace and correlation-based outlier detection for high-dimensional data techniques, and one class support vector machines. For example, the machine learning classifier is trained based on features relating to workload resource consumption (e.g., features such as normalized frequencies resulting from text analytics, etc.). After training, the resulting machine learning classifier is deployed as a classification model 431 for use in a deployment phase to predict a potential classification for a variation in current workload resource consumption of a particular tenant based on current structured data for the tenant (i.e., structured data analysis).

In one embodiment, the classification system 400 is configured to perform unstructured data analysis and structured data analysis in parallel. In another embodiment, the classification system 400 is configured to perform unstructured data analysis and structured data analysis sequentially, wherein the order of operations performed is configurable.

In one embodiment, the classification system 400 comprises a combining weights unit 440 is configured to: (1) receive a first set of weights 425 for a tenant from the unstructured data analysis unit 420, (2) receive a second set of weights 435 for the tenant from the structured data analysis unit 430, and (3) combine weights included in the first set of weights 425 and the second set of weights 435 to generate a classification 145 for a variation in current workload resource consumption of the tenant. In one embodiment, for each potential classification for the variation, the combining weights unit 440 combines a corresponding weight included in the first set of weights 425 with a corresponding weight included in the second set of weights 435 by applying an aggregation function (e.g., average, median, some percentile, etc.) to the corresponding weights to obtain one corresponding combined weight for the potential classification. The combining weights unit 440 then selects, from all resulting combined weights for all potential classifications, a highest combined weight, wherein the variation is classified as a classification 145 that corresponds to the highest combined weight selected.

In one embodiment, the classification system 400 comprises an optional recommendations unit 445 configured to generate one or more recommendations to a cloud provider based on a classification 145 for a variation in current workload resource consumption of a tenant. In one embodiment, the one or more recommendations include, but are not limited to, one or more of the following: recommended actions the cloud provider can take to better address the needs of the tenant (e.g., enact and enforce improved security measures to overcome cyber-attacks, not overbook computing resources for the tenant, etc.), recommended products the cloud provider can upsell to the tenant (e.g., a compression license if the tenant is continuously growing storage and data stored by the tenant is compression friendly), etc.

Figure 5A:
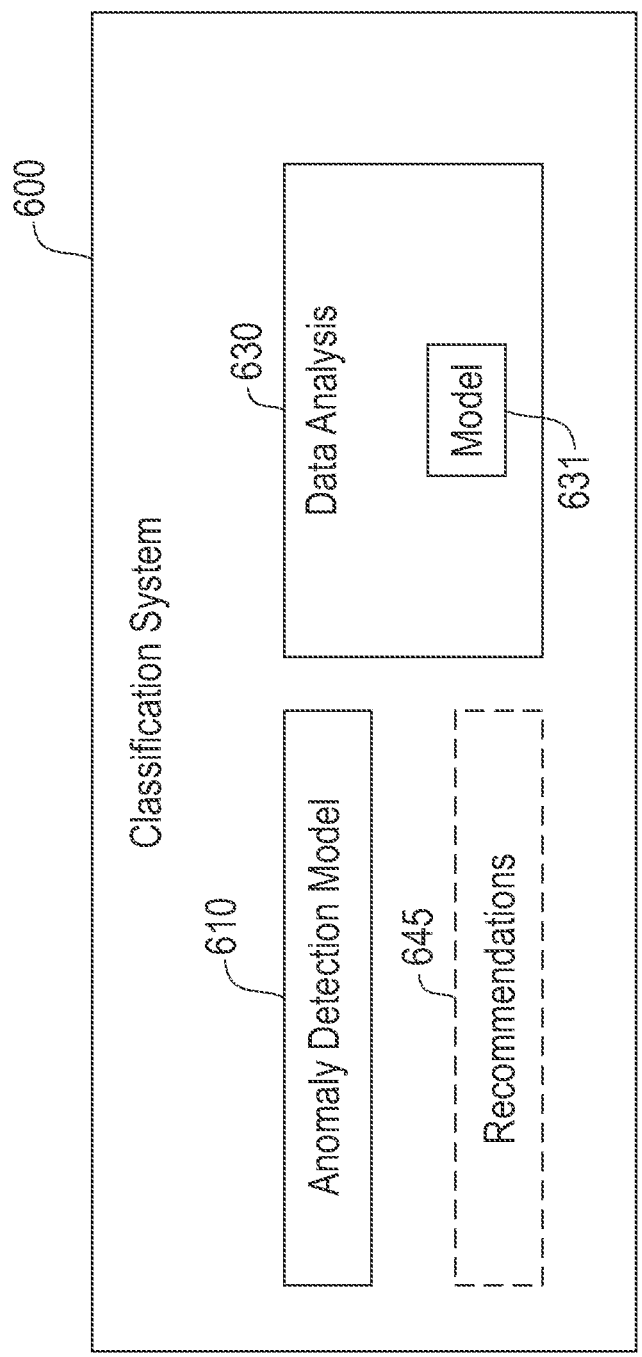
FIG. 5A illustrates a second example classification system configured to detect an anomaly in a variation in current workload resource consumption of a tenant and classify the variation by analyzing together structured data and unstructured data for the tenant, in one or more embodiments.
Figure 5B:
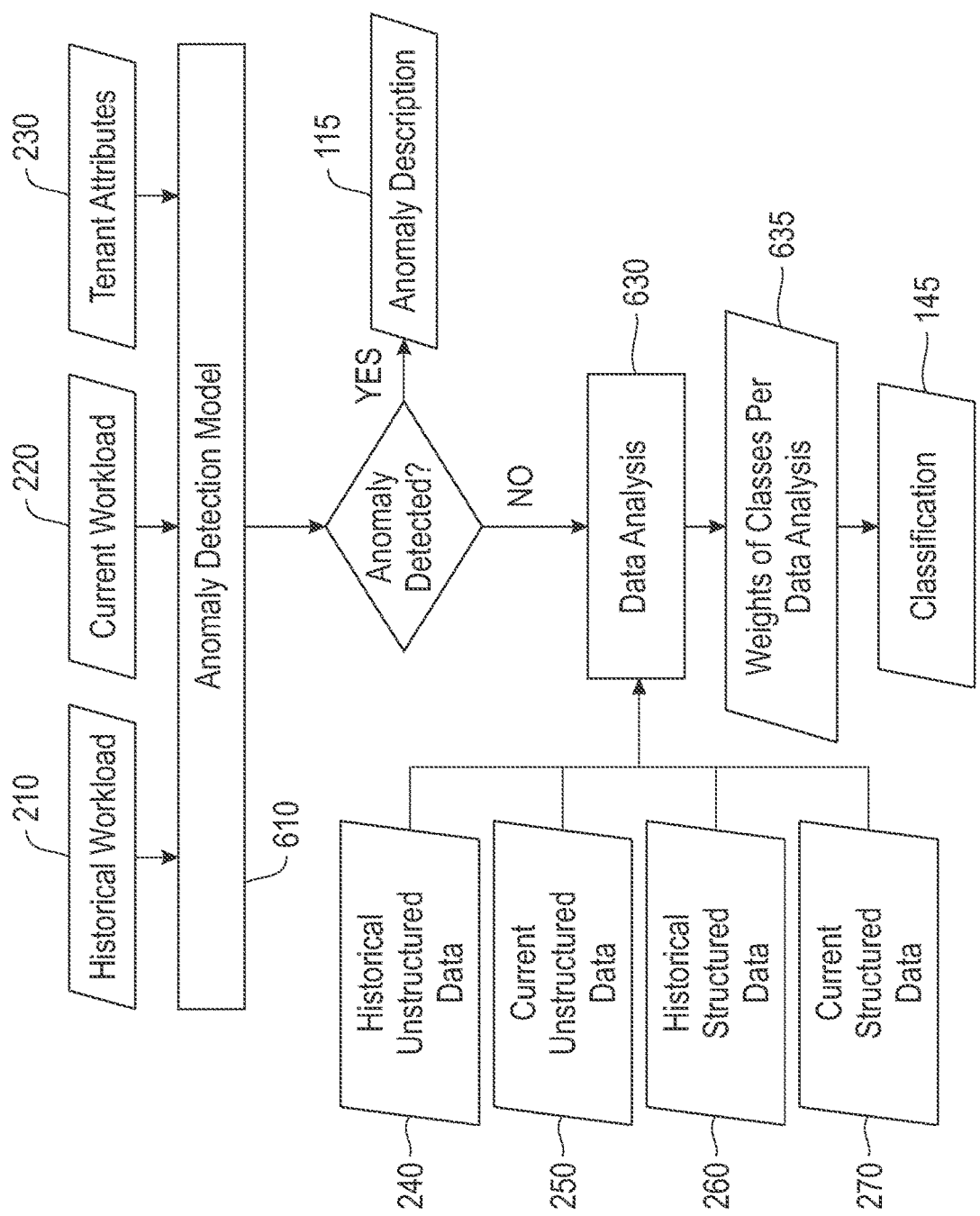
FIG. 5B illustrates an example workflow of the second example classification system, in one or more embodiments.

FIG. 5A illustrates a second example classification system 600 configured to detect an anomaly in a variation in current workload resource consumption of a tenant and classify the variation by analyzing together structured data and unstructured data for the tenant, in one or more embodiments. FIG. 5B illustrates an example workflow of the classification system 600, in one or more embodiments. In one embodiment, the classification system 100 in FIG. 3 is implemented as the classification system 600.

In one embodiment, the classification system 600 comprises a trained anomaly detection model 610 configured to detect an anomaly in a variation in current workload resource consumption of a tenant based on historical workload data 210 for the tenant, current workload data 220 for the tenant, and tenant attributes data 230 indicative of one or more attributes of the tenant. If the anomaly detection model 610 detects an anomaly, the classification system 600 generates, as output, an anomaly description 115 indicative of the anomaly detected. If the anomaly detection model 610 does not detect an anomaly, the classification system 600 proceeds to determine and generate, as output, one or more classifications 145 for the variation.

In one embodiment, examples of different anomalies the anomaly detection model 610 is trained to detect include, but are not limited to, an anomalously high workload resource consumption for a particular period of time where workload resource consumption prior to and after this period of time is not as high and the anomalously high workload resource consumption is triggered by an event (e.g., security/cyber-attacks).

In one embodiment, in a training phase (i.e., training stage), a machine learning classifier is trained to detect an anomaly based on training data including historical workload data 210 for one or more tenants. In one embodiment, different techniques are applied to train the machine learning classifier based on the training data such as, but not limited to, density-based techniques (e.g., k-nearest neighbor, local outlier factor, etc.), subspace and correlation-based outlier detection for high-dimensional data techniques, and one class support vector machines. After training, the resulting machine learning classifier is deployed as an anomaly detection model 610 for use in a deployment phase (i.e., deployment stage) to detect an anomaly in a variation in current workload resource consumption of a particular tenant.

In one embodiment, the classification system 600 analyzes together unstructured data and structured data for a tenant to determine one or more classifications 145 for a variation in current workload resource consumption of the tenant. As described in detail later herein, the classification system 600 utilizes one machine learning classifier trained to predict potential classifications for a variation in workload resource consumption of a tenant. In one embodiment, the potential classifications include, but are not limited to, one or more of the following: (1) a classification representing a deployment of a new application that results in a high steady increase in workload resource consumption for a substantial period of time (e.g., a very long period of time), (2) a classification representing an increase in a number of users accessing a particular application that results in a steady increase in workload resource consumption (the steady increase is less than that resulting from deployment of a new application), and (3) a classification representing a random unknown event. In one embodiment, a variation in current workload resource consumption of a tenant is classified by the classification system 600 as any combination of the above-described classifications.

Specifically, the classification system 600 comprises a data analysis unit 630 configured to: (1) receive one or more types of structured data and unstructured data, such as at least one of historical structured data 260 for one or more tenants (e.g., obtained from historical workload data 210 for the one or more tenants), current structured data 270 for a particular tenant (e.g., obtained from current workload data 220 for the tenant), historical unstructured data 240 for the one or more tenants (e.g., obtained from historical workload data 210 for the one or more tenants) and current unstructured data 250 for the tenant (e.g., obtained from current workload data 220 for the tenant), (2) perform a data analysis by applying a trained classification (i.e., predictive) model 631 to the current structured data and the current unstructured data for the tenant, and (3) based on the data analysis, generate a set of weights 635 for the tenant. In one embodiment, the set of weights 635 comprises, for each potential classification for the variation, a corresponding weight indicative of a likelihood/probability that the variation is classified as the potential classification. In one embodiment, the data analysis unit 630 is configured to receive structured data and unstructured data for each tenant utilizing the cloud computing environment.

In one embodiment, data analysis performed by the data analysis unit 630 involves, but is not limited to, one or more of the following: text analytics (e.g., on text included in structured data and unstructured data), image or video processing (e.g., on photos, images and/or videos included in structured data and unstructured data), audio analytics (e.g., on audio included in structured data and unstructured data), etc. For example, text analytics includes, but is not limited to, analyzing text into word/corpus, counting frequencies, and normalizing the frequencies (e.g., by dividing them by frequency of a word in the whole history).

In one embodiment, in a training phase, a machine learning classifier is trained to predict a potential classification for a variation in workload resource consumption based on training data including historical unstructured data 240 and historical structured data 260 for one or more tenants. In one embodiment, different techniques are applied to train the machine learning classifier based on the training data such as, but not limited to, density-based techniques (e.g., k-nearest neighbor, local outlier factor, etc.), subspace and correlation-based outlier detection for high-dimensional data techniques, and one class support vector machines. For example, the machine learning classifier is trained based on features relating to workload resource consumption (e.g., features such as normalized frequencies resulting from text analytics, etc.). After training, the resulting machine learning classifier is deployed as a classification model 631 for use in a deployment phase to predict a potential classification for a variation in current workload resource consumption of a particular tenant based on current structured data and current unstructured data for the tenant (i.e., unstructured data analysis).

In one embodiment, data analysis performed by the data analysis unit 630 involves structuring unstructured data for a tenant into structured data and performing analytics (e.g., text analytics, etc.) on the resulting structured data.

In one embodiment, the classification system 600 selects, from a set of weights 635 for a tenant, a highest weight, wherein a variation in current workload resource consumption of the tenant is classified as a classification 145 that corresponds to the highest weight selected.

In one embodiment, the classification system 600 comprises an optional recommendations unit 645 configured to generate one or more recommendations to a cloud provider based on a classification 145 for a variation in current workload resource consumption of a tenant. In one embodiment, the one or more recommendations include, but are not limited to, one or more of the following: recommended actions the cloud provider can take to better address the needs of the tenant (e.g., enact and enforce improved security measures to overcome cyber attacks, not overbook computing resources for the tenant, etc.), recommended products the cloud provider can upsell to the tenant (e.g., a compression license), etc.

Unlike the classification system 400 in FIGS. 4A-4B that utilizes two different classification models (e.g., classification models 421 and 431) to classify a variation in current workload resource consumption of a tenant, the classification system 600 utilizes only one classification model (e.g., classification model 631) to classify a variation in current workload resource consumption of a tenant. Further, unlike the classification system 400 in FIGS. 4A-4B where two different sets of weights (e.g., first set of weights 425 and second set of weights 435) are obtained as a result of utilizing the two different classification models, only one set of weights (e.g., the set of weights 635) is obtained in the classification system 600 as a result of utilizing only one classification model. In one embodiment, compared to the classification system 400, the classification system 600 simplifies operations (e.g., removing the need to combine weights, analyze structured data and unstructured data separately, etc.) and reduces amount of resources required (e.g., memory, processing power, communication bandwidth, etc.).

Figure 6A:
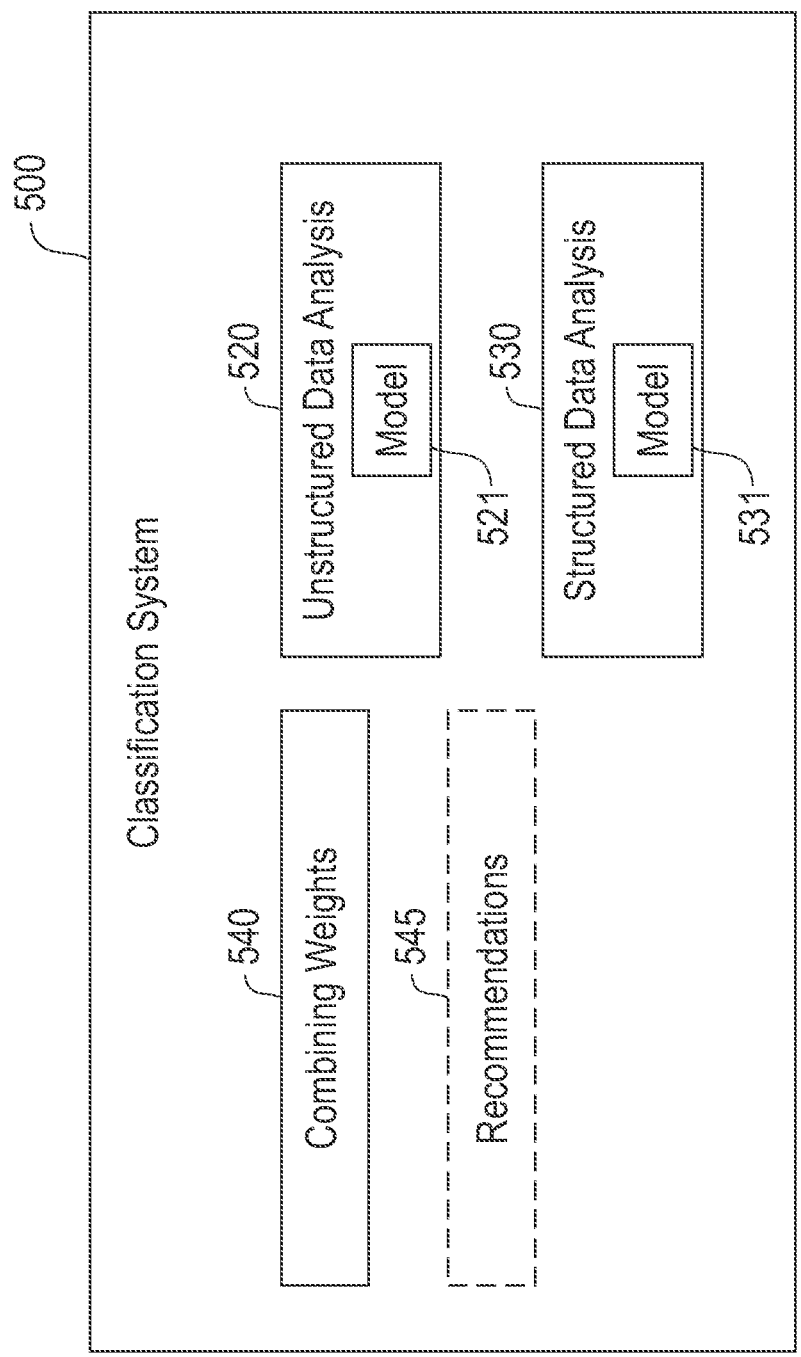
FIG. 6A illustrates a third example classification system configured to classify a variation in current workload resource consumption of a tenant by analyzing structured data and unstructured data separately, wherein potential classifications for the variation include a classification that the variation is an anomaly, in one or more embodiments.
Figure 6B:
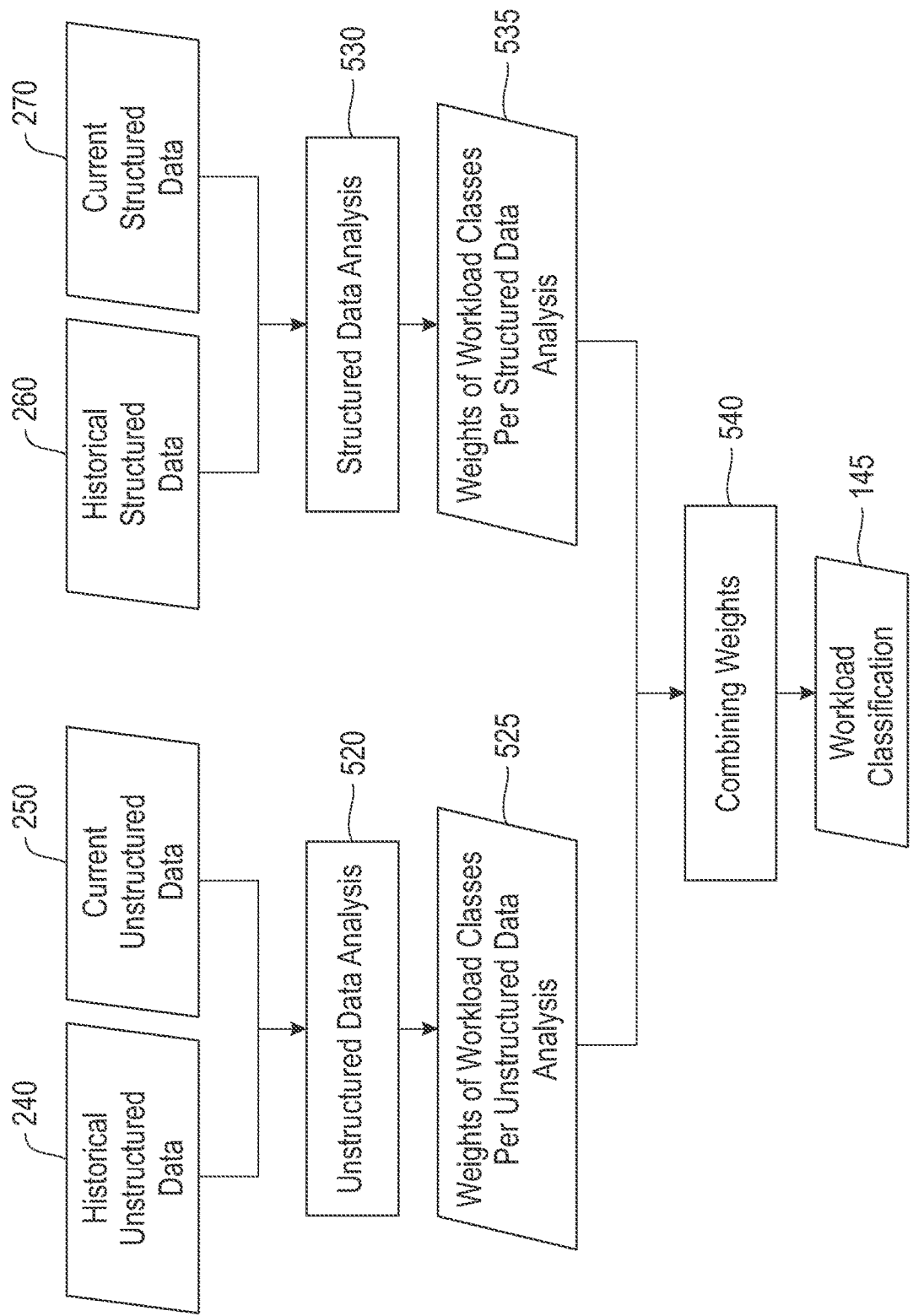
FIG. 6B illustrates an example workflow of the third example classification system, in one or more embodiments.

FIG. 6A illustrates a third example classification system 500 configured to classify a variation in current workload resource consumption of a tenant by analyzing structured data and unstructured data separately, wherein potential classifications for the variation include a classification that the variation is an anomaly, in one or more embodiments. FIG. 6B illustrates an example workflow of the classification system 500, in one or more embodiments. In one embodiment, the classification system 100 in FIG. 3 is implemented as the classification system 500.

In one embodiment, the classification system 500 separately analyzes current unstructured data and current structured data for a tenant to determine one or more classifications 145 for a variation in current workload resource consumption of the tenant. As described in detail later herein, the classification system 500 utilizes two different machine learning classifiers, wherein each machine learning classifier is trained to predict potential classifications for a variation in workload resource consumption of a tenant. In one embodiment, the potential classifications include, but are not limited to, one or more of the following: (1) a classification representing a deployment of a new application that results in a high steady increase in workload resource consumption for a substantial period of time (e.g., a very long period of time), (2) a classification representing an increase in a number of users accessing a particular application that results in a steady increase in workload resource consumption (the steady increase is less than that resulting from deployment of a new application), (3) a classification representing an anomalously high workload resource consumption (i.e., an anomaly) for a particular period of time where workload resource consumption prior to and after this period of time is not as high, and the anomalously high resource consumption is triggered by an event (e.g., security/cyber-attacks), and (4) a classification representing a random unknown event. In one embodiment, a variation in current workload resource consumption of a tenant is classified by the classification system 500 as any combination of the above-described classifications.

Specifically, the classification system 500 comprises unstructured data analysis unit 520 configured to: (1) receive one or more types of unstructured data, such as at least one of historical unstructured data 240 for one or more tenants (e.g., obtained from historical workload data 210 for the one or more tenants) and current unstructured data 250 for a particular tenant (e.g., obtained from current workload data 220 for the tenant), (2) perform unstructured data analysis by applying a trained classification model 521 to the current unstructured data for the tenant, and (3) based on the unstructured data analysis, generate a first set of weights 525 for the tenant. In one embodiment, the first set of weights 525 comprises, for each potential (i.e., candidate) classification (i.e., class) for the variation, a corresponding weight indicative of a likelihood/probability that the variation is classified as the potential classification. In one embodiment, the unstructured data analysis unit 520 is configured to receive unstructured data for each tenant utilizing the cloud computing environment.

In one embodiment, unstructured data analysis performed by the unstructured data analysis unit 520 involves, but is not limited to, one or more of the following: text analytics (e.g., on text included in unstructured data), image or video processing (e.g., on photos, images and/or videos included in unstructured data), audio analytics (e.g., on audio included in unstructured data), etc. For example, text analytics includes, but is not limited to, analyzing text into word/corpus, counting frequencies, and normalizing the frequencies (e.g., by dividing them by frequency of a word in the whole history).

In one embodiment, in a training phase, a machine learning classifier is trained to predict a potential classification for a variation in workload resource consumption based on training data including historical unstructured data 240 for one or more tenants. In one embodiment, different techniques are applied to train the machine learning classifier based on the training data such as, but not limited to, density-based techniques (e.g., k-nearest neighbor, local outlier factor, etc.), subspace and correlation-based outlier detection for high-dimensional data techniques, and one class support vector machines. For example, the machine learning classifier is trained based on features relating to workload resource consumption (e.g., features such as normalized frequencies resulting from text analytics, etc.). After training, the resulting machine learning classifier is deployed as a classification model 521 for use in a deployment phase to predict a potential classification for a variation in current workload resource consumption of a particular tenant based on current unstructured data for the tenant (i.e., unstructured data analysis).

In one embodiment, unstructured data analysis performed by the unstructured data analysis unit 520 involves structuring unstructured data for a tenant into structured data and performing analytics (e.g., text analytics, etc.) on the resulting structured data.

In one embodiment, the classification system 500 comprises structured data analysis unit 530 configured to: (1) receive one or more types of structured data, such as at least one of historical structured data 260 for one or more tenants (e.g., obtained from historical workload data 210 for the one or more tenants) and current structured data 270 for a particular tenant (e.g., obtained from current workload data 220 for the tenant), (2) perform structured data analysis by applying a trained classification model 531 to the current structured data for the tenant, and (3) based on the structured data analysis, generate a second set of weights 535 for the tenant. The second set of weights 535 comprises, for each potential classification for the variation, a corresponding weight indicative of a likelihood/probability that the variation is classified as the potential classification. In one embodiment, the structured data analysis unit 530 is configured to receive structured data for each tenant utilizing the cloud computing environment.

In one embodiment, structured data analysis performed by the structured data analysis unit 530 involves, but is not limited to, one or more of the following: text analytics (e.g., on text included in structured data), image or video processing (e.g., on photos, images and/or videos included in structured data), audio analytics (e.g., on audio included in structured data), etc.

In one embodiment, in a training phase, a machine learning classifier is trained to predict a potential classification for a variation in workload resource consumption based on training data including historical structured data 260 for one or more tenants. In one embodiment, different techniques are applied to train the machine learning classifier based on the training data such as, but not limited to, density-based techniques (e.g., k-nearest neighbor, local outlier factor, etc.), subspace and correlation-based outlier detection for high-dimensional data techniques, and one class support vector machines. For example, the machine learning classifier is trained based on features relating to workload resource consumption (e.g., features such as normalized frequencies resulting from text analytics, etc.). After training, the resulting machine learning classifier is deployed as a classification model 531 for use in a deployment phase to predict a potential classification for a variation in current workload resource consumption of a particular tenant based on current structured data for the tenant (i.e., structured data analysis).

In one embodiment, the classification system 500 is configured to perform unstructured data analysis and structured data analysis in parallel. In another embodiment, the classification system 500 is configured to perform unstructured data analysis and structured data analysis sequentially, wherein the order of operations performed is configurable.

In one embodiment, the classification system 500 comprises a combining weights unit 540 is configured to: (1) receive a first set of weights 525 for a tenant from the unstructured data analysis unit 520, (2) receive a second set of weights 535 for the tenant from the structured data analysis unit 530, and (3) combine weights included in the first set of weights 525 and the second set of weights 535 to generate a classification 145 for a variation in current workload resource consumption of the tenant. In one embodiment, for each potential classification for the variation, the combining weights unit 540 combines a corresponding weight included in the first set of weights 525 with a corresponding weight included in the second set of weights 535 by applying an aggregation function (e.g., average, median, some percentile, etc.) to the corresponding weights to obtain one corresponding combined weight for the potential classification. The combining weights unit 540 then selects, from all resulting combined weights for all potential classifications, a highest combined weight, wherein the variation is classified as a classification 145 that corresponds to the highest combined weight selected.

In one embodiment, the classification system 500 comprises an optional recommendations unit 545 configured to generate one or more recommendations to a cloud provider based on a classification 145 for a variation in current workload resource consumption of a tenant. In one embodiment, the one or more recommendations include, but are not limited to, one or more of the following: recommended actions the cloud provider can take to better address the needs of the tenant (e.g., enact and enforce improved security measures to overcome cyber-attacks, not overbook computing resources for the tenant, etc.), recommended products the cloud provider can upsell to the tenant (e.g., a compression license), etc.

Unlike the classification system 400 in FIGS. 4A-4B that utilizes an anomaly detection model (e.g., anomaly detection model 410) to detect an anomaly in a variation in current workload resource consumption of a tenant, the classification system 500 bypasses use of an anomaly detection model by utilizing classification models (e.g., classification models 521 and 522) that are trained to classify a variation in current workload resource consumption of a tenant as an anomaly. In one embodiment, compared to the classification system 400, the classification system 500 simplifies operations (e.g., bypassing use of an anomaly detection model, etc.) and reduces amount of resources required (e.g., memory, processing power, communication bandwidth, etc.).

Figure 7A:
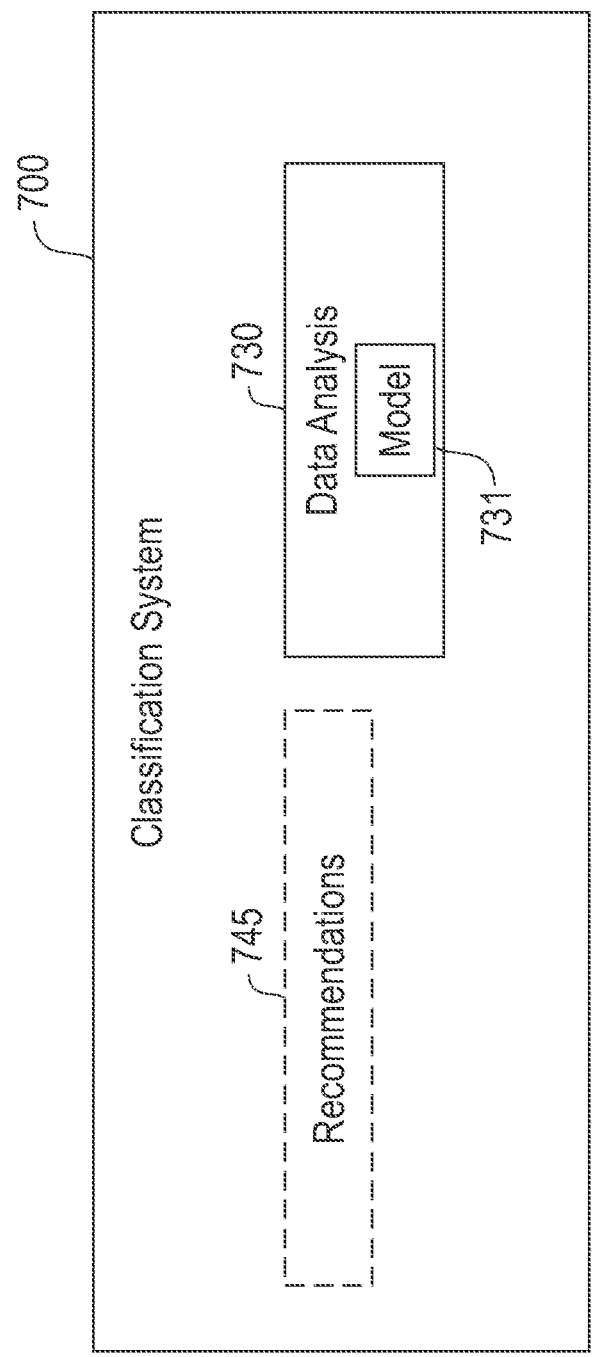
FIG. 7A illustrates a fourth example classification system configured to classify a variation in current workload resource consumption of a tenant by analyzing together structured data and unstructured data, wherein potential classifications for the variation include a classification that the variation is an anomaly, in one or more embodiments.
Figure 7B:
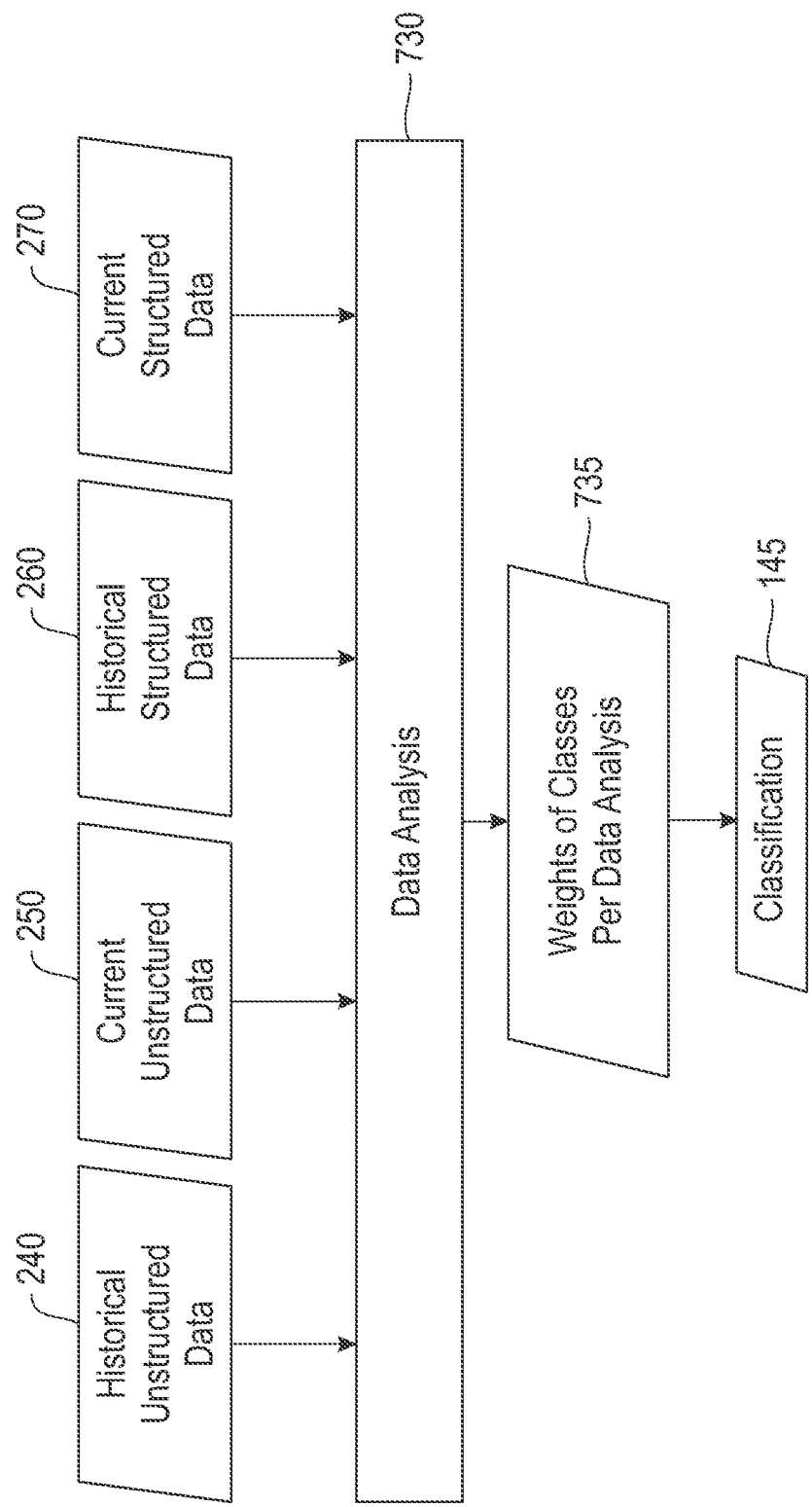
FIG. 7B illustrates an example workflow of the fourth example classification system, in one or more embodiments.

FIG. 7A illustrates a fourth example classification system 700 configured to classify a variation in current workload resource consumption of a tenant by analyzing together structured data and unstructured data, wherein potential classifications for the variation include a classification that the variation is an anomaly, in one or more embodiments. FIG. 7B illustrates an example workflow of the classification system 700, in one or more embodiments. In one embodiment, the classification system 100 in FIG. 3 is implemented as the classification system 700.

In one embodiment, the classification system 700 analyzes together current unstructured data and current structured data for a tenant to determine one or more classifications 145 for a variation in current workload resource consumption of the tenant. As described in detail later herein, the classification system 700 utilizes one machine learning classifier trained to predict potential classifications for a variation in workload resource consumption of a tenant. In one embodiment, the potential classifications include, but are not limited to, one or more of the following: (1) a classification representing a deployment of a new application that results in a high steady increase in workload resource consumption for a substantial period of time (e.g., a very long period of time), (2) a classification representing an increase in a number of users accessing a particular application that results in a steady increase in workload resource consumption (the steady increase is less than that resulting from deployment of a new application), (3) a classification representing an anomalously high workload resource consumption (i.e., an anomaly) for a particular period of time where workload resource consumption prior to and after this period of time is not as high, and the anomalously high resource consumption is triggered by an event (e.g., security/cyber-attacks), and (4) a classification representing a random unknown event. In one embodiment, a variation in current workload resource consumption of a tenant is classified by the classification system 700 as any combination of the above-described classifications.

Specifically, the classification system 700 comprises a data analysis unit 730 configured to: (1) receive one or more types of structured data and unstructured data, such as at least one of historical structured data 260 for one or more tenants (e.g., obtained from historical workload data 210 for the one or more tenants), current structured data 270 for a particular tenant (e.g., obtained from current workload data 220 for the tenant), historical unstructured data 240 for the tenant (e.g., obtained from historical workload data 210 for the tenant) and current unstructured data 250 for the tenant (e.g., obtained from current workload data 220 for the tenant), (2) perform a data analysis by applying a trained classification (i.e., predictive) model 731 to all the structured data and unstructured data for the tenant, and (3) based on the data analysis, generate a set of weights 735 for the tenant. In one embodiment, the set of weights 735 comprises, for each potential classification for the variation, a corresponding weight indicative of a likelihood/probability that the variation is classified as the potential classification. In one embodiment, the data analysis unit 730 is configured to receive structured data and unstructured data for each tenant utilizing the cloud computing environment.

In one embodiment, data analysis performed by the data analysis unit 730 involves, but is not limited to, one or more of the following: text analytics (e.g., on text included in structured data and unstructured data), image or video processing (e.g., on photos, images and/or videos included in structured data and unstructured data), audio analytics (e.g., on audio included in structured data and unstructured data), etc. For example, text analytics includes, but is not limited to, analyzing text into word/corpus, counting frequencies, and normalizing the frequencies (e.g., by dividing them by frequency of a word in the whole history).

In one embodiment, in a training phase, a machine learning classifier is trained to predict a potential classification for a variation in workload resource consumption based on training data including historical unstructured data 240 and historical structured data 260 for one or more tenants. In one embodiment, different techniques are applied to train the machine learning classifier based on the training data such as, but not limited to, density-based techniques (e.g., k-nearest neighbor, local outlier factor, etc.), subspace and correlation-based outlier detection for high-dimensional data techniques, and one class support vector machines. For example, the machine learning classifier is trained based on features relating to workload resource consumption (e.g., features such as normalized frequencies resulting from text analytics, etc.). After training, the resulting machine learning classifier is deployed as a classification model 731 for use in a deployment phase to predict a potential classification for a variation in current workload resource consumption of a particular tenant based on current structured data and current unstructured data for the tenant (i.e., unstructured data analysis).

In one embodiment, data analysis performed by the data analysis unit 730 involves structuring unstructured data for a tenant into structured data and performing analytics (e.g., text analytics, etc.) on the resulting structured data.

In one embodiment, the classification system 700 selects, from a set of weights 735 for a tenant, a highest weight, wherein a variation in current workload resource consumption of the tenant is classified as a classification 145 that corresponds to the highest weight selected.

In one embodiment, the classification system 700 comprises an optional recommendations unit 745 configured to generate one or more recommendations to a cloud provider based on a classification 145 for a variation in current workload resource consumption of a tenant. In one embodiment, the one or more recommendations include, but are not limited to, one or more of the following: recommended actions the cloud provider can take to better address the needs of the tenant (e.g., enact and enforce improved security measures to overcome cyber-attacks, not overbook computing resources for the tenant, etc.), recommended products the cloud provider can upsell to the tenant (e.g., a compression license), etc.

Unlike the classification system 600 in FIGS. 5A-5B that utilizes an anomaly detection model (e.g., anomaly detection model 610) to detect an anomaly in a variation in current workload resource consumption of a tenant, the classification system 700 bypasses use of an anomaly detection model by utilizing a classification model (e.g., classification model 731) that is trained to classify a variation in current workload resource consumption of a tenant as an anomaly. In one embodiment, compared to the classification system 600, the classification system 700 simplifies operations (e.g., bypassing use of an anomaly detection model, etc.) and reduces amount of resources required (e.g., memory, processing power, communication bandwidth, etc.).

Figure 8:
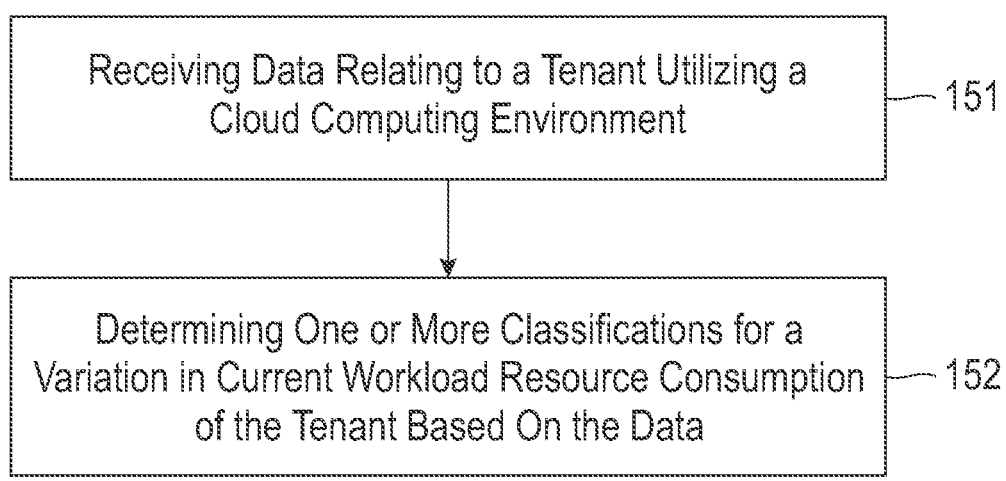
FIG. 8 is a flowchart of an example process for cognitive classification of workload behaviors in a multi-tenant cloud computing environment, in one or more embodiments.

FIG. 8 is a flowchart of an example process 150 for cognitive classification of workload behaviors in a multi-tenant cloud computing environment, in one or more embodiments. Process block 151 includes receiving data (e.g., current workload data 220) relating to a tenant utilizing the cloud computing environment. Process block 152 includes determining one or more classifications for a variation in current workload resource consumption of the tenant based on the data.

In one embodiment, process blocks 151-152 is performed by one or more embodiments of the classification system 100 in FIG. 3, such as the first classification system 400 in FIGS. 4A-4B, the second classification system 600 in FIGS. 5A-5B, the third classification system 500 in FIGS. 6A-6B, and the fourth classification system 700 in FIGS. 7A-7B.

Figure 9:
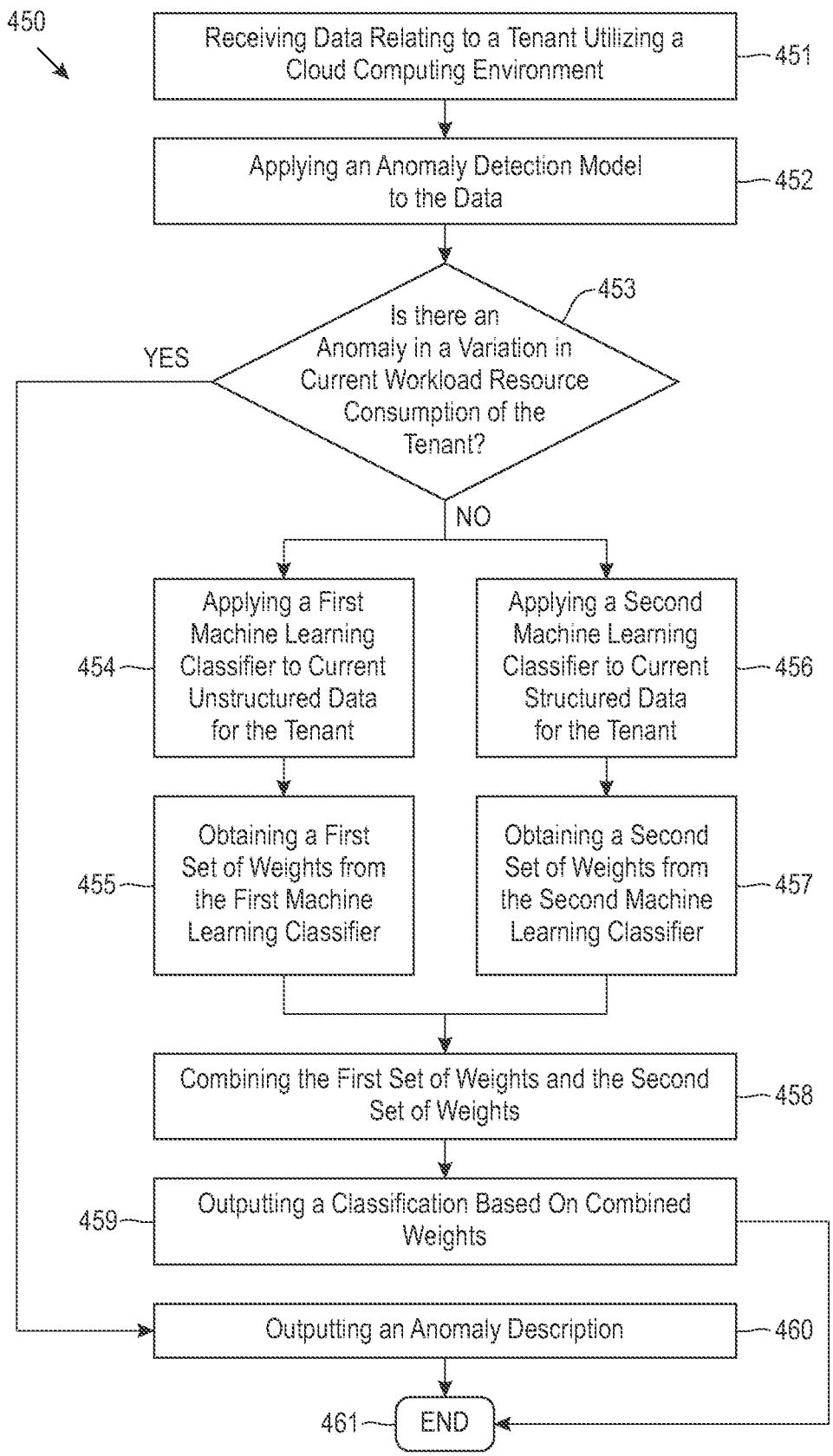
FIG. 9 is a flowchart of an example process for detecting an anomaly in a variation in current workload resource consumption of a tenant and classifying the variation by analyzing structured data and unstructured data for the tenant separately, in one or more embodiments.

FIG. 9 is a flowchart of an example process 450 for detecting an anomaly in a variation in current workload resource consumption of a tenant and classifying the variation by analyzing structured data and unstructured data for the tenant separately, in one or more embodiments. Process block 451 includes receiving data (e.g., current workload data 220) relating to a tenant utilizing the cloud computing environment. Process block 452 includes applying an anomaly detection model (e.g., anomaly detection model 410) to the data. Process block 453 includes determining whether there is an anomaly in a variation in current workload resource consumption of the tenant based on the anomaly detection model. If there is an anomaly, the process 450 proceeds to process block 460. If there is no anomaly, the process 450 proceeds to process blocks 454 and 456.

Process block 454 includes applying a first machine learning classifier (e.g., classification model 421) to current unstructured data (e.g., current unstructured data 250) for the tenant. Process block 455 includes obtaining a first set of weights (e.g., first set of weights 425) from the first machine learning classifier, then proceeding to process block 458.

Process block 456 includes applying a second machine learning classifier (e.g., classification model 431) to current structured data (e.g., current structured data 270) for the tenant. Process block 457 includes obtaining a second set of weights (e.g., second set of weights 435) from the second machine learning classifier, then proceeding to process block 458.

In one embodiment, process blocks 454-455 and process blocks 456-457 are performed in parallel. In another embodiment, process blocks 454-455 and process blocks 456-457 are performed sequentially.

Process block 458 includes combining the first set of weights and the second set of weights.

Process block 459 includes outputting a classification (e.g., classification 145) for the variation based on combined weights from process block 458, then proceeding to process block 461.

Process block 460 includes outputting an anomaly description (e.g., anomaly description 115), then proceeding to process block 461.

In process block 461, the process 450 ends.

In one embodiment, process blocks 451-461 are performed by one or more components of the classification system 400 in FIGS. 4A-4B, such as the anomaly detection model 410, the structured data analysis unit 430, the unstructured data analysis unit 420, and the combining weights unit 440.

Figure 10:
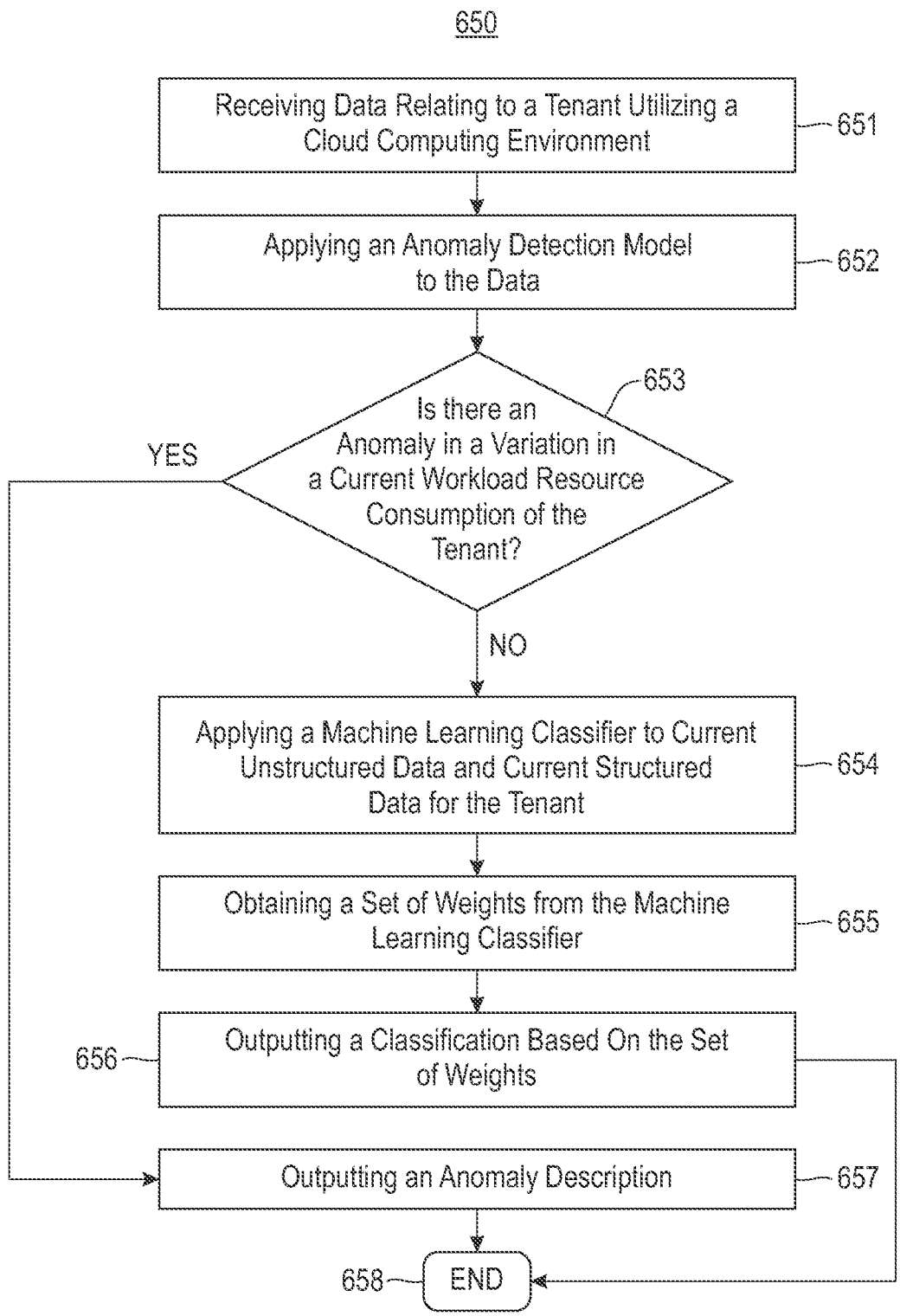
FIG. 10 is a flowchart of an example process for detecting an anomaly in a variation in current workload resource consumption of a tenant and classifying the variation by analyzing together structured data and unstructured data for the tenant, in one or more embodiments.

FIG. 10 is a flowchart of an example process 650 for detecting an anomaly in a variation in current workload resource consumption of a tenant and classifying the variation by analyzing together structured data and unstructured data for the tenant, in one or more embodiments. Process block 651 includes receiving data (e.g., current workload data 220) relating to a tenant utilizing the cloud computing environment. Process block 652 includes applying an anomaly detection model (e.g., anomaly detection model 610) to the data. Process block 653 includes determining whether there is an anomaly in a variation in current workload resource consumption of the tenant based on the anomaly detection model. If there is an anomaly, the process 650 proceeds to process block 657. If there is no anomaly, the process 650 proceeds to process block 654.

Process block 654 includes applying a machine learning classifier (e.g., classification model 631) to current structured data (e.g., current structured data 270) and current unstructured data (e.g., current unstructured data 250) for the tenant. Process block 655 includes obtaining a set of weights (e.g., first set of weights 635) from the machine learning classifier.

Process block 656 includes outputting a classification (e.g., classification 145) for the variation based on the set of weights, then proceeding to process block 658.

Process block 657 includes outputting an anomaly description (e.g., anomaly description 115), then proceeding to process block 658.

In process block 658, the process 650 ends.

In one embodiment, process blocks 651-658 are performed by one or more components of the classification system 600 in FIGS. 5A-5B, such as the anomaly detection model 610 and the data analysis unit 630.

Figure 11:
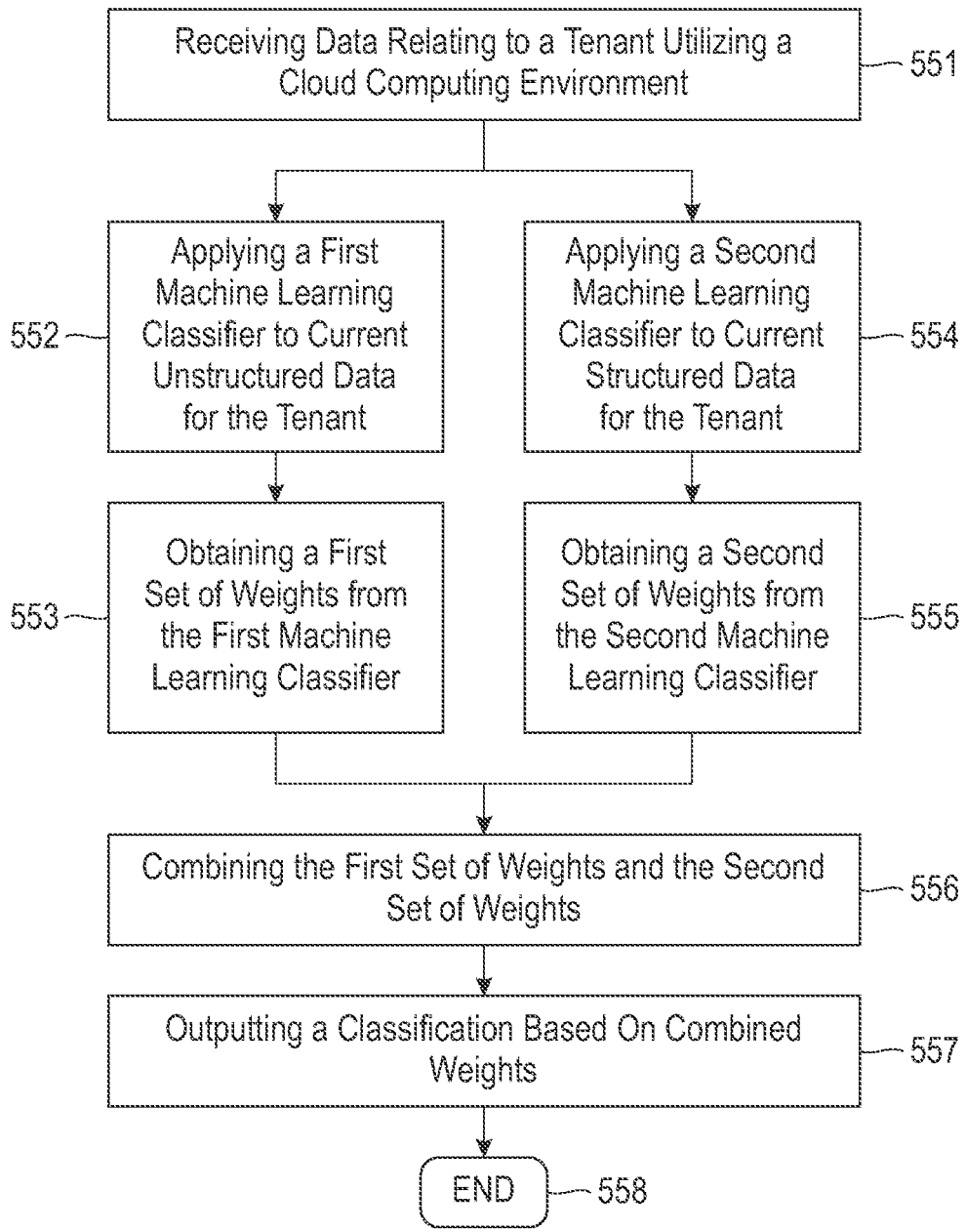
FIG. 11 is a flowchart of an example process for classifying a variation in current workload resource consumption of a tenant by analyzing structured data and unstructured data for the tenant separately, wherein potential classifications for the variation include a classification that the variation is an anomaly, in one or more embodiments.

FIG. 11 is a flowchart of an example process 550 for classifying a variation in current workload resource consumption of a tenant by analyzing structured data and unstructured data for the tenant separately, wherein potential classifications for the variation include a classification that the variation is an anomaly, in one or more embodiments. Process block 551 includes receiving data (e.g., current workload data 220) relating to a tenant utilizing the cloud computing environment, then proceeding to process blocks 552 and 554.

Process block 552 includes applying a first machine learning classifier (e.g., classification model 521) to current unstructured data (e.g., current unstructured data 250) for the tenant. Process block 553 includes obtaining a first set of weights (e.g., first set of weights 525) from the first machine learning classifier, then proceeding to process block 556.

Process block 554 includes applying a second machine learning classifier (e.g., classification model 531) to current structured data (e.g., current structured data 270) for the tenant. Process block 555 includes obtaining a second set of weights (e.g., second set of weights 535) from the second machine learning classifier, then proceeding to process block 556.

In one embodiment, process blocks 552-553 and process blocks 554-555 are performed in parallel. In another embodiment, process blocks 552-553 and process blocks 554-555 are performed sequentially.

Process block 556 includes combining the first set of weights and the second set of weights.

Process block 557 includes outputting a classification (e.g., classification 145) for the variation based on combined weights from process block 556.

In process block 558, the process 550 ends.

In one embodiment, process blocks 551-558 are performed by one or more components of the classification system 500 in FIGS. 6A-6B, such as the structured data analysis unit 530, the unstructured data analysis unit 520, and the combining weights unit 540.

Figure 12:
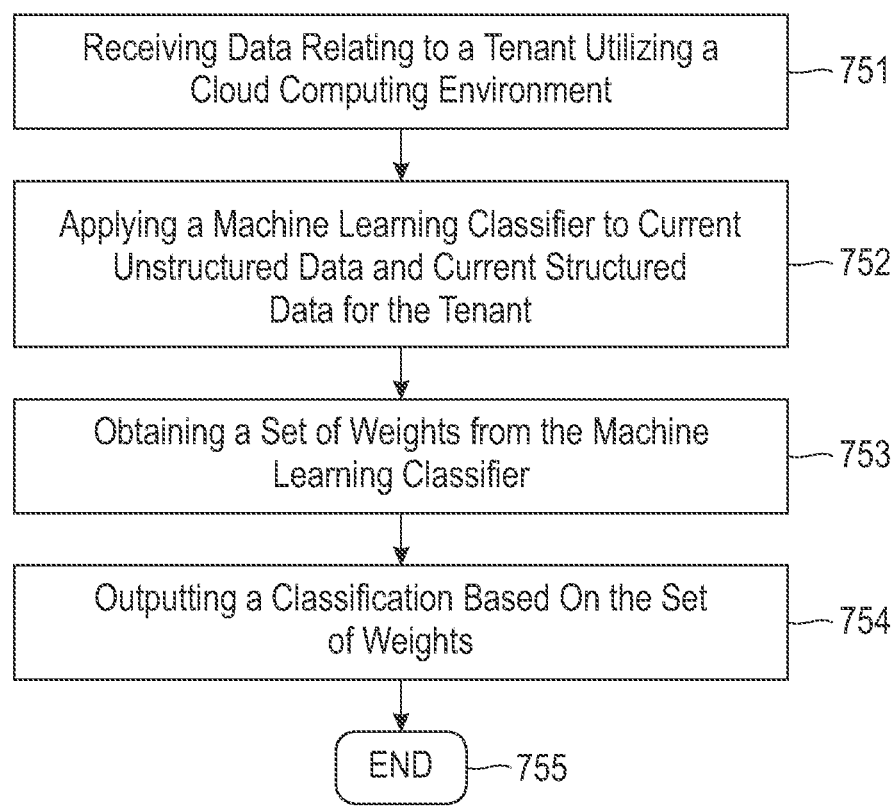
FIG. 12 is a flowchart of an example process for classifying a variation in current workload resource consumption of a tenant by analyzing together structured data and unstructured data for the tenant, wherein potential classifications for the variation include a classification that the variation is an anomaly, in one or more embodiments.

FIG. 12 is a flowchart of an example process 750 for classifying a variation in current workload resource consumption of a tenant by analyzing together structured data and unstructured data for the tenant, wherein potential classifications for the variation include a classification that the variation is an anomaly, in one or more embodiments. Process block 751 includes receiving data (e.g., current workload data 220) relating to a tenant utilizing the cloud computing environment. Process block 752 includes applying a machine learning classifier (e.g., classification model 731) to current structured data (e.g., current structured data 270 and current unstructured data (e.g., current unstructured data 250) for the tenant. Process block 753 includes obtaining a set of weights (e.g., set of weights 735) from the machine learning classifier.

Process block 754 includes outputting a classification (e.g., classification 145) for the variation based on the set of weights.

In process block 755, the process 750 ends.

In one embodiment, process blocks 751-755 are performed by one or more components of the classification system 700 in FIGS. 7A-7B, such as the data analysis unit 730.

Figure 13:
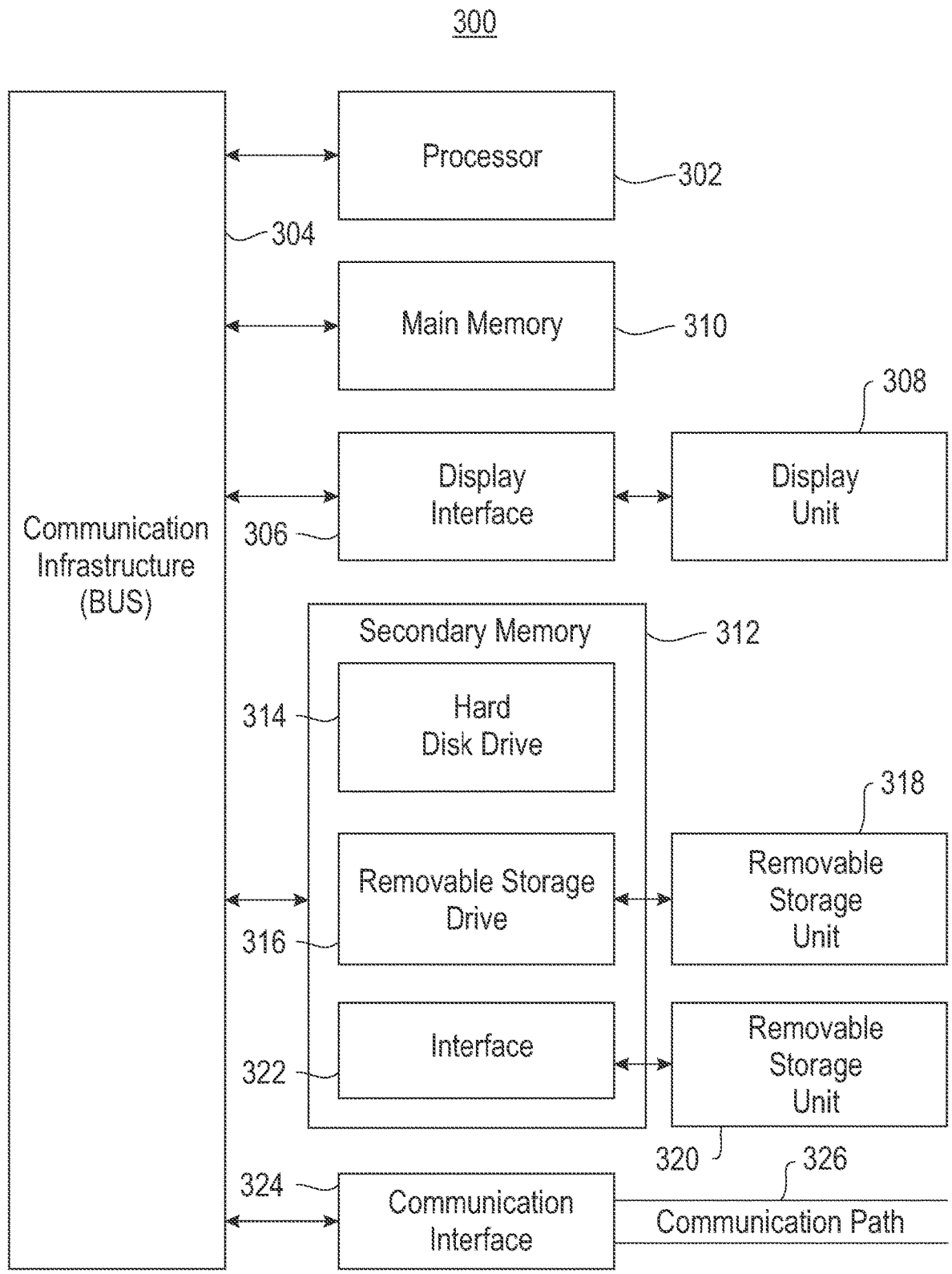
FIG. 13 is a high level block diagram showing an information processing system useful for implementing an embodiment of the present invention.

FIG. 13 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. In one embodiment, the computer system also includes a main memory 310, preferably random access memory (RAM), and also includes a secondary memory 312. In one embodiment, the secondary memory 312 includes, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 includes other similar means for allowing computer programs or other instructions to be loaded into the computer system. Such means include, for example, a removable storage unit 320 and an interface 322. Examples of such means include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

In one embodiment, the computer system also includes a communication interface 324. Communication interface 324 allows software and data to be transferred between the computer system and external devices. In one embodiment, examples of communication interface 324 include a modem, a network interface (such as an Ethernet card), a communication port, or a PCMCIA slot and card, etc. In one embodiment, software and data transferred via communication interface 324 are in the form of signals which are, for example, electronic, electromagnetic, optical, or other signals capable of being received by communication interface 324. These signals are provided to communication interface 324 via a communication path (i.e., channel) 326. In one embodiment, this communication path 326 carries signals and is implemented using wire or cable, fiber optics, a phone line, a cellular phone link, an RF link, and/or other communication channels.

Embodiments of the present invention provide a system, a method, and/or a computer program product. In one embodiment, the computer program product includes a computer readable storage medium (or media) having computer readable program instructions thereon for causing a processor to carry out aspects of the present invention. The computer readable storage medium can be a tangible device that can retain and store instructions for use by an instruction execution device. In one embodiment, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of embodiments of the present invention are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one embodiment, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one embodiment, these computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one embodiment, these computer readable program instructions are also stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one embodiment, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, in one embodiment, each block in the flowchart or block diagrams represents a module, segment, or portion of instructions, which comprises one or more executable instructions for implementing the specified logical function(s). In some alternative implementations, the functions noted in the block occur out of the order noted in the figures. For example, in one embodiment, two blocks shown in succession are, in fact, executed substantially concurrently, or the blocks are sometimes executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the present invention provide a system, computer program product, and method for implementing the embodiments of the invention. Embodiments of the present invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the present invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. Various embodiments of the invention were chosen and described in order to best explain the principles of the embodiments of the invention and the practical application, and to enable others of ordinary skill in the art to understand the embodiments of the invention with various modifications as are suited to the particular use contemplated.

What is claimed is:

1. A method comprising:
    receiving data relating to a tenant utilizing a cloud computing environment, wherein the data related to the tenant is indicative of one or more types and one or more timings of one or more events that are attributable to one or more variations in workload resource consumption of the tenant;
    training, based on the data related to the tenant, at least one machine learning classifier to detect whether a variation in the workload resource consumption of the tenant is anomalous;
    determining, via the at least one machine learning classifier, one or more classifications for a variation in current workload resource consumption of the tenant, wherein the current workload resource consumption is indicative of current usage of one or more computing resources of the cloud computing environment; and
    generating, based on the one or more classifications, one or more recommendations to improve security of the cloud computing environment.

2. The method of claim 1, wherein the data related to the tenant comprises one or more of the following: historical structured data for one or more tenants that includes historical workload resource consumption of the one or more tenants and one or more historical attributes of the one or more tenants, historical unstructured data for the one or more tenants, current structured data for the tenant that includes the current workload resource consumption and one or more current attributes of the tenant, or current unstructured data for the tenant.

3. The method of claim 2, wherein determining, via the at least one machine learning classifier, one or more classifications for a variation in current workload resource consumption of the tenant comprises:
    determining whether there is an anomaly in the variation in the current workload resource consumption of the tenant by applying the at least one machine learning classifier to the data related to the tenant; and
    generating an anomaly description in response to determining there is an anomaly in the variation in the current workload resource consumption of the tenant, wherein the anomaly description is indicative of the anomaly in the variation in the current workload resource consumption of the tenant.

4. The method of claim 3, further comprising:
training the at least one machine learning classifier to detect whether a variation in the workload resource consumption of the tenant is anomalous based on at least one of the historical structured data for the one or more tenants and the historical unstructured data for the one or more tenants.

5. The method of claim 2, wherein determining, via the at least one machine learning classifier, one or more classifications for a variation in current workload resource consumption of the tenant comprises:
analyzing the current unstructured data for the tenant and the current structured data for the tenant separately by:
applying a first machine learning classifier to the current unstructured data for the tenant;
applying a second machine learning classifier to the current structured data for the tenant;
obtaining a first set of weights from the first machine learning classifier; and
obtaining a second set of weights from the second machine learning classifier;
wherein each set of weights comprises, for each potential classification for the variation in the current workload resource consumption of the tenant, a corresponding weight indicative of a likelihood that the variation in the current workload resource consumption of the tenant is classified with the potential classification.

6. The method of claim 5, wherein analyzing the current unstructured data for the tenant and the current structured data for the tenant separately further comprises:
combining the first set of weights and the second set of weights based on an aggregate function; and
selecting a highest weight from the combined sets of weights, wherein the variation in the current workload resource consumption of the tenant is classified with a classification corresponding to the highest weight selected.

7. The method of claim 5, further comprising:
training the first machine learning classifier to predict a classification for a variation in the workload resource consumption of the tenant based on the historical unstructured data for the one or more tenants; and
training the second machine learning classifier to predict a classification for a variation in the workload resource consumption of the tenant based on the historical structured data for the one or more tenants;
wherein the one or more types and the one or more timings of the one or more events that are attributable to the one or more variations in the workload resource consumption of the tenant are learned by the first machine learning classifier and the second machine learning classifier.

8. The method of claim 2, wherein determining, via the at least one machine learning classifier, one or more classifications for a variation in current workload resource consumption of the tenant comprises:
analyzing together the current unstructured data for the tenant and the current structured data for the tenant by applying a first machine learning classifier to both the current unstructured data for the tenant and the current structured data for the tenant;
obtaining a set of weights from the first machine learning classifier, wherein the set of weights comprises, for each potential classification for the variation in the current workload resource consumption of the tenant, a corresponding weight indicative of a likelihood that the variation in the current workload resource consumption of the tenant is classified with the potential classification; and
selecting a highest weight from the set of weights, wherein the variation in the current workload resource consumption of the tenant is classified with a classification corresponding to the highest weight selected.

9. The method of claim 8, further comprising:
training the first machine learning classifier to predict a classification for a variation in the workload resource consumption of the tenant based on the historical unstructured data for the one or more tenants and the historical structured data for the one or more tenants, wherein the one or more types and the one or more timings of the one or more events that are attributable to the one or more variations in the workload resource consumption of the tenant are learned by the first machine learning classifier.

10. The method of claim 2, wherein determining, via the at least one machine learning classifier, one or more classifications for a variation in current workload resource consumption of the tenant comprises:
performing at least one of text analytics on the current unstructured data for the tenant, image or video processing on the current unstructured data for the tenant, or audio analytics on the current unstructured data for the tenant.

11. The method of claim 2, wherein the variation in the current workload resource consumption of the tenant is classifiable as a combination of one or more of the following classifications: a classification representing a deployment of a new application, a classification representing an increase in a number of users accessing an application, or a classification representing a random unknown event.

12. The method of claim 2, wherein the variation in the current workload resource consumption of the tenant is classifiable as a combination of one or more of the following classifications: a classification representing a deployment of a new application, a classification representing an increase in a number of users accessing an application, a classification representing an anomaly, or a classification representing a random unknown event.

13. A system comprising:
at least one processor; and
a non-transitory processor-readable memory device storing instructions that when executed by the at least one processor causes the at least one processor to perform operations including:
receiving data relating to a tenant utilizing a cloud computing environment, wherein the data related to the tenant is indicative of one or more types and one or more timings of one or more events that are attributable to one or more variations in workload resource consumption of the tenant;
training, based on the data related to the tenant, at least one machine learning classifier to detect whether a variation in the workload resource consumption of the tenant is anomalous;
determining, via the at least one machine learning classifier, one or more classifications for a variation in current workload resource consumption of the tenant, wherein the current workload resource consumption is indicative of current usage of one or more computing resources of the cloud computing environment; and generating, based on the one or more classifications, one or more recommendations to improve security of the cloud computing environment.

14. The system of claim 13, wherein the data related to the tenant comprises one or more of the following: historical structured data for one or more tenants that includes historical workload resource consumption of the one or more tenants and one or more historical attributes of the one or more tenants, historical unstructured data for the one or more tenants, current structured data for the tenant that includes the current workload resource consumption and one or more current attributes of the tenant, or current unstructured data for the tenant.

15. The system of claim 14, wherein determining, via the at least one machine learning classifier, one or more classifications for a variation in current workload resource consumption of the tenant comprises:
   determining whether there is an anomaly in the variation in the current workload resource consumption of the tenant by applying the at least one machine learning classifier to the data related to the tenant; and
   generating an anomaly description in response to determining there is an anomaly in the variation in the current workload resource consumption of the tenant, wherein the anomaly description is indicative of the anomaly in the variation in the current workload resource consumption of the tenant.

16. The system of claim 14, wherein determining, via the at least one machine learning classifier, one or more classifications for a variation in current workload resource consumption of the tenant comprises:
   analyzing the current unstructured data for the tenant and the current structured data for the tenant separately by:
      applying a first machine learning classifier to the current unstructured data for the tenant;
      applying a second machine learning classifier to the current structured data for the tenant;
      obtaining a first set of weights from the first machine learning classifier; and
      obtaining a second set of weights from the second machine learning classifier;
      wherein each set of weights comprises, for each potential classification for the variation in the current workload resource consumption of the tenant, a corresponding weight indicative of a likelihood that the variation in the current workload resource consumption of the tenant is classified with the potential classification.

17. The system of claim 16, wherein analyzing the current unstructured data for the tenant and the current structured data for the tenant separately further comprises:
   combining the first set of weights and the second set of weights based on an aggregate function; and
   selecting a highest weight from the combined sets of weights, wherein the variation in the current workload resource consumption of the tenant is classified with a classification corresponding to the highest weight selected.

18. The system of claim 14, wherein determining, via the at least one machine learning classifier, one or more classifications for a variation in current workload resource consumption of the tenant comprises:
   analyzing together the current unstructured data for the tenant and the current structured data for the tenant by applying a first machine learning classifier to both the current unstructured data for the tenant and the current structured data for the tenant;
   obtaining a set of weights from the first machine learning classifier, wherein the set of weights comprises, for each potential classification for the variation in the current workload resource consumption of the tenant, a corresponding weight indicative of a likelihood that the variation in the current workload resource consumption of the tenant is classified with the potential classification; and
   selecting a highest weight from the set of weights, wherein the variation in the current workload resource consumption of the tenant is classified with a classification corresponding to the highest weight selected.

19. A computer program product comprising a computer-readable hardware storage medium having program code embodied therewith, the program code being executable by a computer to implement a method comprising:
   receiving data relating to a tenant utilizing a cloud computing environment, wherein the data related to the tenant is indicative of one or more types and one or more timings of one or more events that are attributable to one or more variations in workload resource consumption of the tenant;
   training, based on the data related to the tenant, at least one machine learning classifier to detect whether a variation in the workload resource consumption of the tenant is anomalous;
   determining, via the at least one machine learning classifier, one or more classifications for a variation in current workload resource consumption of the tenant, wherein the current workload resource consumption is indicative of current usage of one or more computing resources of the cloud computing environment; and
   generating, based on the one or more classifications, one or more recommendations to improve security of the cloud computing environment.

20. The computer program product of claim 19, wherein the data related to the tenant comprises one or more of the following: historical structured data for one or more tenants that includes historical workload resource consumption of the one or more tenants and one or more historical attributes of the one or more tenants, historical unstructured data for the one or more tenants, current structured data for the tenant that includes the current workload resource consumption and one or more current attributes of the tenant, or current unstructured data for the tenant.

* * * * *